(12) United States Patent
Martini et al.

(10) Patent No.: US 10,065,587 B2
(45) Date of Patent: Sep. 4, 2018

(54) MULTI-LAYER ENERGY ABSORBER

(71) Applicant: Flex|N|Gate Corporation, Warren, MI (US)

(72) Inventors: Paul Martini, Belle River (CA); Steve Perucca, Clinton Township, MI (US); Mike Fu, Clarkston, MI (US)

(73) Assignee: FLEX|N|GATE CORPORATION, Warren, MI (US)

( * ) Notice: Subject to any disclaimer, the term of this patent is extended or adjusted under 35 U.S.C. 154(b) by 31 days.

(21) Appl. No.: 15/359,428

(22) Filed: Nov. 22, 2016

(65) Prior Publication Data

US 2017/0144618 A1  May 25, 2017

Related U.S. Application Data

(60) Provisional application No. 62/258,641, filed on Nov. 23, 2015.

(51) Int. Cl.
*B60R 19/18* (2006.01)
*B60R 19/03* (2006.01)

(52) U.S. Cl.
CPC ............. *B60R 19/18* (2013.01); *B60R 19/03* (2013.01); *B60R 2019/1866* (2013.01)

(58) Field of Classification Search
CPC .......... B60R 19/02; B60R 19/03; B60R 19/18
USPC ....................................... 293/120, 132, 133
See application file for complete search history.

(56) References Cited

U.S. PATENT DOCUMENTS

| | | | |
|---|---|---|---|
| 3,506,295 A | * | 4/1970 | Yancey ............... B60R 19/18 181/207 |
| 3,727,870 A | | 4/1973 | Bass |
| 3,871,636 A | | 3/1975 | Boyle |
| 4,072,334 A | | 2/1978 | Seegmiller et al. |
| 4,105,236 A | | 8/1978 | Haar |
| 4,366,885 A | | 1/1983 | Vrijburg |
| 4,597,601 A | | 7/1986 | Manning |
| 4,715,645 A | | 12/1987 | Lewis et al. |
| 4,753,467 A | | 6/1988 | DeCaluwe et al. |
| 4,770,453 A | | 9/1988 | Reynolds |

(Continued)

FOREIGN PATENT DOCUMENTS

| | | |
|---|---|---|
| DE | 4119640 A | 2/1995 |
| EP | 1103428 A2 | 5/2001 |

(Continued)

*Primary Examiner* — Jason S Daniels
(74) *Attorney, Agent, or Firm* — Foley & Lardner LLP

(57) ABSTRACT

An energy absorber for a vehicle bumper assembly having a central portion that is a multi-layer structure having a unitary front member extending between two end portions, a first layer, a second layer, and a third layer disposed between and interconnecting the first and second layers. The first layer has a first plurality of members forming a first latticework structure having a first network of open sections between the first plurality of members. The first layer extends between the two end portions and between a rear member of the first layer and the unitary front member. The second layer has a second plurality of members forming a second latticework structure having a second network of open sections between the second plurality of members. The second layer extends between the two end portions and between a rear member of the second layer and the unitary front member.

20 Claims, 19 Drawing Sheets

(56) References Cited

U.S. PATENT DOCUMENTS

| | | |
|---|---|---|
| 4,778,208 A | 10/1988 | Lehr et al. |
| 4,826,226 A | 5/1989 | Klie et al. |
| 4,829,979 A | 5/1989 | Moir |
| 4,830,417 A | 5/1989 | Bates et al. |
| 4,856,833 A | 8/1989 | Beekman |
| 4,877,279 A | 10/1989 | Logan |
| 4,893,857 A | 1/1990 | Bobinger et al. |
| 4,925,224 A | 5/1990 | Smiszek |
| 4,929,008 A | 5/1990 | Esfandiary |
| 4,940,270 A | 7/1990 | Yamazaki et al. |
| 4,961,603 A | 10/1990 | Carpenter |
| 4,968,076 A | 11/1990 | Kuroki |
| 4,971,376 A | 11/1990 | Eipper et al. |
| 4,974,891 A | 12/1990 | Zama |
| 4,976,481 A | 12/1990 | Yoshihra |
| 4,998,761 A | 3/1991 | Bayer et al. |
| 5,005,887 A | 4/1991 | Kelman |
| 5,011,205 A | 4/1991 | Liu |
| 5,029,919 A | 7/1991 | Bauer |
| 5,031,947 A | 7/1991 | Chen |
| 5,056,840 A | 10/1991 | Eipper et al. |
| 5,067,759 A | 11/1991 | Fleming |
| 5,078,439 A | 1/1992 | Terada et al. |
| 5,080,410 A | 1/1992 | Stewart et al. |
| 5,080,411 A | 1/1992 | Stewart et al. |
| 5,080,412 A | 1/1992 | Stewart et al. |
| 5,080,427 A | 1/1992 | Sturrus et al. |
| 5,090,755 A | 2/1992 | Garnweidner |
| 5,092,512 A | 3/1992 | Sturrus et al. |
| 5,096,243 A | 3/1992 | Gembinski |
| 5,100,189 A | 3/1992 | Futamata et al. |
| 5,104,026 A | 4/1992 | Sturrus et al. |
| 5,106,137 A | 4/1992 | Curtis |
| 5,116,092 A | 5/1992 | Schonleber |
| 5,150,935 A | 9/1992 | Glance et al. |
| 5,172,948 A | 12/1992 | Garnweidner |
| 5,219,197 A | 6/1993 | Rich et al. |
| 5,265,925 A | 11/1993 | Cox et al. |
| 5,269,574 A * | 12/1993 | Bhutani .............. B60R 19/18 293/102 |
| 5,273,330 A | 12/1993 | Petry et al. |
| 5,277,462 A | 1/1994 | Verzelli et al. |
| 5,290,078 A | 3/1994 | Bayer et al. |
| 5,305,625 A | 4/1994 | Heinz |
| 5,306,058 A | 4/1994 | Sturrus et al. |
| 5,339,933 A | 8/1994 | Bauer et al. |
| 5,340,177 A | 8/1994 | Maxam et al. |
| 5,340,178 A | 8/1994 | Stewart et al. |
| 5,358,294 A | 10/1994 | Palmer |
| 5,393,111 A | 2/1995 | Eipper et al. |
| 5,395,036 A | 3/1995 | Sturrus |
| 5,403,049 A | 4/1995 | Ebbinghaus |
| 5,407,239 A | 4/1995 | Arai et al. |
| 5,425,561 A | 6/1995 | Morgan |
| 5,427,214 A | 6/1995 | Prottengeier et al. |
| 5,431,463 A | 7/1995 | Chou |
| 5,431,464 A | 7/1995 | Jones et al. |
| 5,441,319 A | 8/1995 | Oyama et al. |
| 5,454,504 A | 10/1995 | Sturrus |
| 5,462,144 A | 10/1995 | Guardiola et al. |
| 5,468,033 A | 11/1995 | Dohrmann et al. |
| 5,482,336 A | 1/1996 | Rouse et al. |
| 5,492,207 A | 2/1996 | Clausen |
| 5,498,044 A | 3/1996 | Bovellan et al. |
| 5,498,045 A | 3/1996 | Morgan et al. |
| 5,507,540 A | 4/1996 | Pernot |
| 5,545,022 A | 8/1996 | Rosasco |
| 5,545,361 A | 8/1996 | Rosasco |
| 5,566,874 A | 10/1996 | Sturrus |
| 5,577,784 A | 11/1996 | Nelson |
| 5,625,991 A | 5/1997 | Sturrus |
| 5,626,376 A | 5/1997 | Parker |
| 5,658,027 A | 8/1997 | Eissinger et al. |
| 5,688,006 A | 11/1997 | Bladow et al. |
| 5,711,562 A | 1/1998 | Terada et al. |
| 5,725,266 A | 3/1998 | Anderson et al. |
| 5,725,267 A | 3/1998 | Grosser et al. |
| 5,727,826 A | 3/1998 | Frank et al. |
| 5,732,801 A | 3/1998 | Gertz |
| 5,746,419 A | 5/1998 | McFadden et al. |
| 5,772,267 A | 6/1998 | Heim et al. |
| 5,785,367 A | 7/1998 | Baumann et al. |
| 5,785,368 A | 7/1998 | Hartman et al. |
| 5,788,297 A | 8/1998 | Sugawara et al. |
| 5,799,991 A | 9/1998 | Glance |
| 5,803,514 A | 9/1998 | Shibuya et al. |
| 5,803,517 A | 9/1998 | Shibuya |
| 5,813,594 A | 9/1998 | Sturrus |
| 5,829,805 A | 11/1998 | Watson |
| 5,845,948 A | 12/1998 | Anderson et al. |
| 5,876,078 A | 3/1999 | Miskech et al. |
| 5,927,778 A | 7/1999 | Uytterhaeghe et al. |
| 5,932,165 A | 8/1999 | Corbett et al. |
| 5,934,743 A | 8/1999 | Nohr et al. |
| 5,941,582 A | 8/1999 | Tan |
| 5,947,538 A | 9/1999 | White |
| 5,967,573 A | 10/1999 | Wang |
| 5,967,592 A | 10/1999 | Freeman |
| 5,971,451 A | 10/1999 | Huang |
| 5,984,389 A | 11/1999 | Nuber et al. |
| 5,984,390 A | 11/1999 | Kemp et al. |
| 6,000,738 A | 12/1999 | Stewart et al. |
| 6,003,912 A | 12/1999 | Schonhoff et al. |
| 6,003,930 A | 12/1999 | Frank et al. |
| 6,007,123 A | 12/1999 | Schwartz et al. |
| 6,010,169 A | 1/2000 | Cox et al. |
| 6,042,163 A | 3/2000 | Reiffer |
| 6,053,664 A | 4/2000 | Crane et al. |
| 6,059,331 A | 5/2000 | Mori |
| 6,062,634 A | 5/2000 | Aloe et al. |
| 6,065,786 A | 5/2000 | Wheatley |
| 6,082,792 A | 7/2000 | Evans et al. |
| 6,085,878 A | 7/2000 | Araki et al. |
| 6,089,628 A | 7/2000 | Schuster |
| 6,106,039 A | 8/2000 | Maki |
| 6,129,384 A | 10/2000 | Fischer et al. |
| 6,135,251 A | 10/2000 | Hartlieb et al. |
| 6,148,970 A | 11/2000 | Akad |
| 6,174,008 B1 | 1/2001 | Kramer et al. |
| 6,174,009 B1 | 1/2001 | McKeon |
| 6,179,353 B1 | 1/2001 | Heatherington et al. |
| 6,179,355 B1 | 1/2001 | Chou et al. |
| 6,179,356 B1 | 1/2001 | Hartlieb et al. |
| 6,199,924 B1 | 3/2001 | Oguri et al. |
| 6,199,937 B1 | 3/2001 | Zetouna et al. |
| 6,199,942 B1 | 3/2001 | Carroll et al. |
| 6,209,934 B1 | 4/2001 | Sakuma et al. |
| 6,217,090 B1 | 4/2001 | Berzinji |
| 6,227,583 B1 | 5/2001 | Eipper et al. |
| 6,231,095 B1 | 5/2001 | Chou et al. |
| 6,240,820 B1 | 6/2001 | Sturrus et al. |
| 6,244,625 B1 | 6/2001 | Bayer et al. |
| 6,247,745 B1 | 6/2001 | Carroll et al. |
| 6,250,711 B1 | 6/2001 | Takahara |
| 6,254,161 B1 | 7/2001 | Wochaski |
| 6,270,131 B1 | 8/2001 | Martinez et al. |
| 6,279,973 B1 | 8/2001 | Albertini et al. |
| 6,283,677 B1 | 9/2001 | Slattery et al. |
| 6,286,879 B1 * | 9/2001 | Haque .................... B60R 19/03 293/102 |
| 6,290,272 B1 | 9/2001 | Braun |
| 6,299,226 B1 | 10/2001 | Kroning et al. |
| 6,299,227 B1 | 10/2001 | Kroning et al. |
| 6,308,999 B1 | 10/2001 | Tan et al. |
| 6,312,028 B1 | 11/2001 | Wilkosz |
| 6,315,339 B1 | 11/2001 | Devilliers et al. |
| 6,318,775 B1 | 11/2001 | Heatherington et al. |
| 6,325,431 B1 | 12/2001 | Kaisha |
| 6,334,518 B1 | 1/2002 | Garnweidner et al. |
| 6,334,638 B1 | 1/2002 | Yamamuro et al. |
| 6,334,639 B1 | 1/2002 | Vives et al. |
| 6,338,510 B1 | 1/2002 | Kanamori et al. |
| 6,343,820 B1 | 2/2002 | Pedersen |
| 6,343,821 B2 | 2/2002 | Breed |

(56) References Cited

U.S. PATENT DOCUMENTS

| | | |
|---|---|---|
| 6,345,425 B1 | 2/2002 | Rosasco et al. |
| 6,349,521 B1 | 2/2002 | McKeon et al. |
| 6,357,816 B1 | 3/2002 | Porter |
| 6,361,092 B1 | 3/2002 | Eagle et al. |
| 6,371,540 B1 | 4/2002 | Campanella et al. |
| 6,371,541 B1 | 4/2002 | Pedersen |
| 6,394,512 B1 | 5/2002 | Schuster et al. |
| 6,398,275 B1 | 6/2002 | Hartel et al. |
| 6,406,077 B2 | 6/2002 | Johnson |
| 6,406,081 B1 | 6/2002 | Mahfet et al. |
| 6,409,239 B1 | 6/2002 | Tjoelker et al. |
| 6,412,836 B1 | 7/2002 | Mansoor et al. |
| 6,416,094 B1 | 7/2002 | Cherry |
| 6,428,064 B1 | 8/2002 | Frederick |
| 6,428,086 B2 | 8/2002 | Takahara |
| 6,435,578 B1 | 8/2002 | Li |
| 6,435,601 B2 | 8/2002 | Takahara |
| 6,439,650 B2 | 8/2002 | Artner et al. |
| 6,443,511 B2 | 9/2002 | Braun |
| 6,443,512 B1 | 9/2002 | Van Ress et al. |
| 6,443,513 B1 | 9/2002 | Glance |
| 6,460,667 B1 | 10/2002 | Bruck et al. |
| 6,460,909 B2 | 10/2002 | Mansoor et al. |
| 6,467,821 B2 | 10/2002 | Hirota |
| 6,467,822 B1 | 10/2002 | Leng |
| 6,467,831 B1 | 10/2002 | Mori et al. |
| 6,474,709 B2 | 11/2002 | Artner |
| 6,481,690 B2 | 11/2002 | Kariatsummari et al. |
| 6,484,386 B2 | 11/2002 | Tuin et al. |
| 6,485,072 B1 | 11/2002 | Werner et al. |
| 6,494,510 B2 | 12/2002 | Okamura et al. |
| 6,502,874 B2 | 1/2003 | Kajiwara et al. |
| 6,510,771 B2 | 1/2003 | Sturrus et al. |
| 6,644,701 B2 | 1/2003 | Weissenborn et al. |
| 6,520,552 B2 | 2/2003 | Schroter et al. |
| 6,536,818 B1 | 3/2003 | Moss |
| 6,540,275 B1 | 4/2003 | Iwamoto et al. |
| 6,540,276 B2 | 4/2003 | Azuchi et al. |
| 6,547,295 B2 | 4/2003 | Vismara |
| 6,547,316 B2 | 4/2003 | Chung |
| 6,554,333 B2 | 4/2003 | Shimotsu et al. |
| 6,554,341 B2 | 4/2003 | Lee |
| 6,568,891 B2 | 5/2003 | DeLong |
| 6,637,790 B2 | 5/2003 | Bio |
| 6,575,510 B2 | 6/2003 | Weissenborn |
| 6,588,830 B1 | 7/2003 | Schmidt et al. |
| 6,595,502 B2 | 7/2003 | Koch et al. |
| 6,609,740 B2 | 8/2003 | Evans |
| 6,622,450 B2 | 9/2003 | Nees et al. |
| 6,623,054 B1 | 9/2003 | Palmquist |
| 6,623,055 B2 | 9/2003 | Knaup et al. |
| 6,634,702 B1 | 10/2003 | Pleschke et al. |
| 6,637,786 B2 | 10/2003 | Yamagiwa |
| 6,637,788 B2 | 10/2003 | Zollner et al. |
| 6,643,931 B2 | 11/2003 | Nees |
| 6,644,699 B2 | 11/2003 | Anderson et al. |
| 6,648,383 B2 | 11/2003 | Vismara et al. |
| 6,648,384 B2 | 11/2003 | Nees et al. |
| 6,648,385 B2 | 11/2003 | Frank |
| 6,655,509 B2 | 12/2003 | Dohrmann et al. |
| 6,655,721 B2 | 12/2003 | Hagen |
| 6,659,518 B2 | 12/2003 | Ponsonnaille et al. |
| 6,659,520 B2 | 12/2003 | Bastien et al. |
| 6,659,535 B2 | 12/2003 | Dohrmann |
| 6,663,150 B1 | 12/2003 | Evans |
| 6,663,151 B2 | 12/2003 | Mansoor et al. |
| 6,669,179 B2 | 12/2003 | Dohrmann |
| 6,669,251 B2 | 12/2003 | Trappe |
| 6,679,967 B1 | 1/2004 | Carroll et al. |
| 6,682,804 B2 | 1/2004 | Orndorff |
| 6,684,505 B2 | 2/2004 | Sundgren et al. |
| 6,685,243 B1 | 2/2004 | Evans |
| 6,695,366 B2 | 2/2004 | Cherry |
| 6,695,368 B1 | 2/2004 | Weykamp |
| 6,698,808 B2 | 3/2004 | Burkhardt et al. |
| 6,698,809 B2 | 3/2004 | Stol et al. |
| 6,698,820 B2 | 3/2004 | Nakata |
| 6,702,345 B1 | 3/2004 | Yoshida |
| 6,702,346 B2 | 3/2004 | Wikstrom |
| 6,705,653 B2 | 3/2004 | Gotanda et al. |
| 6,709,036 B1 | 3/2004 | Evans |
| 6,709,044 B2 | 3/2004 | Frank |
| 6,712,410 B2 | 3/2004 | Kudelko et al. |
| 6,712,411 B2 | 3/2004 | Gotanda et al. |
| 6,722,037 B2 | 4/2004 | Nees et al. |
| 6,726,258 B1 | 4/2004 | Sundgren et al. |
| 6,726,261 B2 | 4/2004 | Goto et al. |
| 6,726,262 B2 | 4/2004 | Marijnissen et al. |
| 6,730,386 B1 | 5/2004 | Stahlke et al. |
| 6,733,055 B2 | 5/2004 | Iino |
| 6,736,434 B2 | 5/2004 | Anderson et al. |
| 6,736,449 B2 | 5/2004 | Takahashi et al. |
| 6,672,635 B2 | 6/2004 | Weisenborn et al. |
| 6,742,234 B2 | 6/2004 | Rosasco et al. |
| 6,746,061 B1 | 6/2004 | Evans |
| 6,755,452 B2 | 6/2004 | Cate et al. |
| 6,755,459 B2 | 6/2004 | Thelen et al. |
| 6,758,506 B2 | 7/2004 | Malteste et al. |
| 6,758,507 B2 | 7/2004 | Tarahomi et al. |
| 6,764,099 B2 | 7/2004 | Akiyama et al. |
| 6,764,117 B2 | 7/2004 | Jonsson |
| 6,764,118 B2 | 7/2004 | DePottey et al. |
| 6,764,119 B2 | 7/2004 | Bladow et al. |
| 6,767,039 B2 | 7/2004 | Bird |
| 6,767,502 B2 | 7/2004 | Porter |
| 6,773,044 B2 | 8/2004 | Schambre et al. |
| 6,779,821 B2 | 8/2004 | Hallergren |
| 6,786,520 B2 | 9/2004 | Burkhardt et al. |
| 6,793,256 B2 | 9/2004 | Carley et al. |
| 6,808,215 B2 | 10/2004 | Sakuma et al. |
| 6,814,379 B2 | 11/2004 | Evans |
| 6,814,380 B2 | 11/2004 | Yoshida et al. |
| 6,814,381 B1 | 11/2004 | Frank |
| 6,830,286 B2 | 12/2004 | Bechtold et al. |
| 6,832,795 B2 | 12/2004 | Bastien et al. |
| 6,836,717 B2 | 12/2004 | Bucchele et al. |
| 6,846,026 B2 | 1/2005 | Detwiler et al. |
| 6,846,037 B2 | 1/2005 | Detwiler et al. |
| 6,848,730 B2 | 2/2005 | Evans |
| 6,851,731 B2 | 2/2005 | Janssen |
| 6,857,690 B2 | 2/2005 | Vismara et al. |
| 6,863,322 B2 | 3/2005 | Hunter et al. |
| 6,866,313 B2 | 3/2005 | Mooijman et al. |
| 6,866,333 B2 | 3/2005 | Saitou |
| 6,871,889 B2 | 3/2005 | Ericsson |
| 6,874,831 B1 | 4/2005 | Pouget et al. |
| 6,874,832 B2 | 4/2005 | Evans et al. |
| 6,877,785 B2 | 4/2005 | Evans et al. |
| 6,949,209 B2 | 4/2005 | Zander et al. |
| 6,886,872 B2 | 5/2005 | Matsumoto et al. |
| 6,886,873 B2 | 5/2005 | Weykamp et al. |
| 6,890,011 B2 | 5/2005 | Arvelo et al. |
| 6,893,062 B2 | 5/2005 | Amano et al. |
| 6,893,063 B2 | 5/2005 | Harrison et al. |
| 6,893,064 B2 | 5/2005 | Satou |
| 6,899,195 B2 | 5/2005 | Miyasaka |
| 6,902,215 B1 | 6/2005 | Condeelis |
| 6,908,127 B2 | 6/2005 | Evans |
| 6,908,129 B2 | 6/2005 | Shimotsu |
| 6,908,130 B2 | 6/2005 | Reutlinger et al. |
| 6,918,621 B2 | 7/2005 | Seksaria |
| 6,923,483 B2 | 8/2005 | Curry et al. |
| 6,923,494 B2 | 8/2005 | Shuler et al. |
| 6,926,321 B2 | 8/2005 | Zipfel |
| 6,926,325 B2 | 8/2005 | Frank |
| 6,929,296 B2 | 8/2005 | Yang |
| 6,929,297 B2 | 8/2005 | Yang |
| 6,932,201 B2 | 8/2005 | Akiyama et al. |
| 6,932,398 B2 | 8/2005 | Frank |
| 6,926,323 B2 | 9/2005 | Evans |
| 6,938,936 B2 | 9/2005 | Mooijman et al. |
| 6,938,948 B1 | 9/2005 | Cornell et al. |
| 6,942,262 B2 | 9/2005 | Glasgow et al. |
| 6,945,576 B1 | 9/2005 | Arentzen |

(56) References Cited

U.S. PATENT DOCUMENTS

| | | |
|---|---|---|
| 6,957,846 B2 | 10/2005 | Saeki |
| 6,959,950 B2 | 11/2005 | Bladow et al. |
| 6,962,245 B2 | 11/2005 | Ray et al. |
| 6,962,379 B2 | 11/2005 | Minami et al. |
| 6,971,690 B2 | 12/2005 | Evans et al. |
| 6,971,691 B1 | 12/2005 | Heatherington et al. |
| 6,971,692 B2 | 12/2005 | Gioia et al. |
| 6,971,694 B2 | 12/2005 | Sakuma et al. |
| 6,974,166 B2 | 12/2005 | Ledford et al. |
| 6,976,718 B2 | 12/2005 | Nakanishi |
| 6,983,832 B2 | 1/2006 | Namuduri et al. |
| 6,983,964 B2 | 1/2006 | Murata et al. |
| 6,986,536 B1 | 1/2006 | Heatherington et al. |
| 6,988,753 B1 | 1/2006 | Omura et al. |
| 6,988,754 B1 | 1/2006 | Watts |
| 6,994,384 B2 | 2/2006 | Shuler et al. |
| 6,997,490 B2 | 2/2006 | Evans et al. |
| 7,000,975 B2 | 2/2006 | Haneda et al. |
| 7,004,519 B2 | 2/2006 | Roussel et al. |
| 7,011,350 B2 | 3/2006 | Stol et al. |
| 7,011,360 B2 | 3/2006 | Lanard et al. |
| 7,017,960 B2 | 3/2006 | Reierson et al. |
| 7,021,686 B2 | 4/2006 | Glasgow et al. |
| 7,025,396 B2 | 4/2006 | Omura et al. |
| 7,029,044 B2 | 4/2006 | Browne et al. |
| 7,036,844 B2 | 5/2006 | Hammer et al. |
| 7,044,514 B2 | 5/2006 | Mustafa et al. |
| 7,044,515 B2 | 5/2006 | Mooijman et al. |
| 7,052,056 B2 | 5/2006 | Weissenborn et al. |
| 7,059,590 B2 | 6/2006 | Bronstad |
| 7,059,642 B2 | 6/2006 | Ohno et al. |
| 7,066,509 B2 | 6/2006 | Kolaritsch et al. |
| 7,070,217 B2 | 7/2006 | Longo |
| 7,073,831 B2 | 7/2006 | Evans |
| 7,077,438 B2 | 7/2006 | Albers et al. |
| 7,077,439 B2 | 7/2006 | White et al. |
| 7,077,441 B2 | 7/2006 | Lee |
| 7,077,442 B2 | 7/2006 | Arns |
| 7,086,690 B2 | 8/2006 | Shuler et al. |
| 7,093,866 B2 | 8/2006 | Toneatti et al. |
| 7,097,221 B2 | 8/2006 | Andrasic et al. |
| 7,097,234 B2 | 8/2006 | Schonebeck |
| 7,100,952 B2 | 9/2006 | Reierson et al. |
| 7,108,092 B2 | 9/2006 | Suwa et al. |
| 7,108,303 B2 | 9/2006 | Bladow et al. |
| 7,131,674 B2 | 11/2006 | Evans et al. |
| 7,134,700 B2 | 11/2006 | Evans |
| 7,143,856 B2 | 12/2006 | Takahashi et al. |
| 7,144,054 B2 | 12/2006 | Evans |
| 7,144,055 B2 | 12/2006 | Kimura et al. |
| 7,147,258 B2 | 12/2006 | Evans et al. |
| 7,156,433 B2 | 1/2007 | Evans |
| 7,159,911 B2 | 1/2007 | Nguyen et al. |
| 7,160,621 B2 | 1/2007 | Chaudhari et al. |
| 7,163,241 B2 | 1/2007 | Liu et al. |
| 7,163,242 B2 | 1/2007 | Shuler et al. |
| 7,163,243 B2 | 1/2007 | Evans |
| 7,165,794 B2 | 1/2007 | Banry et al. |
| 7,172,227 B2 | 2/2007 | Weissenborn et al. |
| 7,188,876 B2 | 3/2007 | Jaarda et al. |
| 7,188,890 B1 | 3/2007 | Baccouche et al. |
| 7,189,040 B2 | 3/2007 | Sharp et al. |
| 7,192,068 B1 | 3/2007 | Kim |
| 7,198,309 B2 | 4/2007 | Reynolds |
| 7,201,412 B2 | 4/2007 | Kashiwagi et al. |
| 7,201,413 B2 | 4/2007 | Hillekes et al. |
| 7,201,414 B2 | 4/2007 | Iketo et al. |
| 7,204,531 B2 | 4/2007 | Kim |
| 7,210,717 B1 | 5/2007 | Baccouche et al. |
| 7,210,719 B2 | 5/2007 | Honda et al. |
| 7,213,436 B2 | 5/2007 | Sturrus et al. |
| 7,213,867 B2 | 5/2007 | Haneda et al. |
| 7,222,896 B2 | 5/2007 | Evans |
| 7,222,897 B2 | 5/2007 | Evans et al. |
| 7,226,097 B2 | 6/2007 | Adachi et al. |
| 7,228,723 B2 | 6/2007 | Evans et al. |
| 7,234,741 B1 | 6/2007 | Reynolds et al. |
| 7,240,932 B2 | 7/2007 | Guinehut |
| 7,240,933 B2 | 7/2007 | Glasgow et al. |
| 7,255,378 B1 | 8/2007 | Baccouche et al. |
| D549,993 S | 9/2007 | Guiles et al. |
| 7,273,247 B2 | 9/2007 | Grueneklee et al. |
| 7,275,781 B2 | 10/2007 | Wakefield |
| 7,278,667 B2 | 10/2007 | Mohapatra et al. |
| 7,290,783 B2 | 11/2007 | Dornbos |
| 7,290,810 B2 | 11/2007 | Stenbach et al. |
| 7,290,811 B1 | 11/2007 | Arns |
| 7,290,812 B2 | 11/2007 | Smith et al. |
| 7,296,833 B2 | 11/2007 | Mohapatra et al. |
| 7,300,080 B2 | 11/2007 | Rebuffet et al. |
| 7,316,432 B2 | 1/2008 | Muskos |
| 7,325,861 B2 | 2/2008 | Zacheiss et al. |
| 7,337,642 B2 | 3/2008 | Lyons et al. |
| 7,338,038 B2 | 3/2008 | Maurer et al. |
| 7,340,833 B2 | 3/2008 | Weissenborn et al. |
| 7,341,299 B2 | 3/2008 | Baccouche et al. |
| 7,344,008 B1 | 3/2008 | Jonsson et al. |
| 7,347,465 B2 | 3/2008 | Jayasuriya et al. |
| 7,357,430 B2 | 4/2008 | Kariander |
| 7,357,432 B2 | 4/2008 | Roll et al. |
| 7,360,811 B2 | 5/2008 | Roll et al. |
| 7,370,893 B2 | 5/2008 | Tamada et al. |
| 7,628,444 B2 | 12/2009 | Cormier et al. |
| 7,681,700 B2 * | 3/2010 | Ginja ............... B60R 19/18 188/371 |
| 7,866,716 B2 | 1/2011 | Perucca et al. |
| 2002/0060462 A1 | 5/2002 | Glance |
| 2002/0060463 A1 | 5/2002 | Gotanda et al. |
| 2002/0101086 A1 | 8/2002 | Koch et al. |
| 2003/0020219 A1 | 1/2003 | Konenberg |
| 2003/0141729 A1 | 7/2003 | Burkhardt et al. |
| 2003/0155782 A1 | 8/2003 | Iino |
| 2003/0164618 A1 | 9/2003 | Gentle |
| 2004/0003974 A1 | 1/2004 | Ashmead |
| 2004/0051321 A1 | 3/2004 | Hanai et al. |
| 2004/0124645 A1 | 7/2004 | Koch |
| 2004/0160071 A1 | 8/2004 | Suganuma et al. |
| 2004/0174025 A1 | 9/2004 | Converse et al. |
| 2004/0251716 A1 | 12/2004 | Choi et al. |
| 2005/0040660 A1 | 2/2005 | Evans |
| 2005/0077739 A1 | 4/2005 | Vismara et al. |
| 2005/0082853 A1 | 4/2005 | Wallman |
| 2005/0087999 A1 | 4/2005 | Campbell et al. |
| 2005/0104392 A1 | 5/2005 | Liebhard et al. |
| 2005/0196233 A1 | 9/2005 | Vijay et al. |
| 2005/0213478 A1 | 9/2005 | Glasgow et al. |
| 2005/0225102 A1 | 10/2005 | Wallman et al. |
| 2005/0269823 A1 | 12/2005 | DeVoursney et al. |
| 2005/0269824 A1 | 12/2005 | Steeg et al. |
| 2006/0001277 A1 | 1/2006 | Melis et al. |
| 2006/0001278 A1 | 1/2006 | Evans et al. |
| 2006/0028032 A1 | 2/2006 | Henseleit |
| 2006/0028035 A1 | 2/2006 | Bechtold et al. |
| 2006/0028038 A1 | 2/2006 | Glasgow et al. |
| 2006/0196134 A1 | 2/2006 | Livernois |
| 2006/0061111 A1 | 3/2006 | Ignafol |
| 2006/0066116 A1 | 3/2006 | Straughn |
| 2006/0071486 A1 | 4/2006 | Lamparter |
| 2006/0082169 A1 | 4/2006 | Kuhne |
| 2006/0255602 A1 | 5/2006 | Evans |
| 2006/0125254 A1 | 6/2006 | Arns et al. |
| 2006/0131902 A1 | 6/2006 | Shimoda |
| 2006/0145490 A1 | 7/2006 | Yamaguchi et al. |
| 2006/0169906 A1 | 8/2006 | Bhatt |
| 2006/0181090 A1 | 8/2006 | Boivin et al. |
| 2006/0186569 A1 | 8/2006 | Olive et al. |
| 2006/0186702 A1 | 8/2006 | Kisanuki et al. |
| 2006/0226665 A1 | 10/2006 | Kwok |
| 2006/0237976 A1 | 10/2006 | Glasgow |
| 2006/0244274 A1 | 11/2006 | Frank et al. |
| 2006/0255604 A1 | 11/2006 | Condeelis |
| 2006/0261613 A1 | 11/2006 | Byers et al. |
| 2007/0007780 A1 | 1/2007 | Lagiewka et al. |
| 2007/0024069 A1 | 2/2007 | Takagi et al. |

(56) References Cited

U.S. PATENT DOCUMENTS

| | | |
|---|---|---|
| 2007/0029824 A1 | 2/2007 | Hodoya et al. |
| 2007/0040398 A1 | 2/2007 | Lutke-Bexten et al. |
| 2007/0046042 A1 | 3/2007 | Campbell et al. |
| 2007/0046043 A1 | 3/2007 | Ito |
| 2007/0046044 A1 | 3/2007 | Tanabe |
| 2007/0056819 A1 | 3/2007 | Kano et al. |
| 2007/0180880 A1 | 3/2007 | Lyons et al. |
| 2007/0074556 A1 | 4/2007 | Heatherington |
| 2007/0095001 A1 | 5/2007 | Heatherington |
| 2007/0108778 A1 | 5/2007 | Evans et al. |
| 2007/0114772 A1 | 5/2007 | Evans |
| 2007/0132251 A1 | 6/2007 | Lee |
| 2007/0138815 A1 | 6/2007 | Fukukawa et al. |
| 2007/0145755 A1 | 6/2007 | Shioya et al. |
| 2007/0176440 A1 | 8/2007 | Henseleit |
| 2007/0176442 A1 | 8/2007 | Mori et al. |
| 2007/0182172 A1 | 8/2007 | Hasegawa |
| 2007/0187958 A1 | 8/2007 | Bouchez |
| 2007/0187959 A1 | 8/2007 | Adachi et al. |
| 2007/0200374 A1 | 8/2007 | Troton et al. |
| 2007/0200375 A1 | 8/2007 | Ito et al. |
| 2007/0200376 A1 | 8/2007 | Jaarda et al. |
| 2007/0216198 A1 | 9/2007 | Nakamae et al. |
| 2007/0222237 A1 | 9/2007 | Kemp et al. |
| 2007/0228706 A1 | 10/2007 | Nagae et al. |
| 2007/0228746 A1 | 10/2007 | Cormier et al. |
| 2007/0228747 A1 | 10/2007 | Chung |
| 2007/0246956 A1 | 10/2007 | Nagai et al. |
| 2007/0257497 A1 | 11/2007 | Heatherington et al. |
| 2007/0267877 A1 | 11/2007 | Arns |
| 2007/0278803 A1 | 12/2007 | Jaarda et al. |
| 2007/0284895 A1 | 12/2007 | Toneatti et al. |
| 2007/0284896 A1 | 12/2007 | Wakabayashi et al. |
| 2008/0001416 A1 | 1/2008 | Chaudhari et al. |
| 2008/0012364 A1 | 1/2008 | Boggess |
| 2008/0012365 A1 | 1/2008 | Harvey |
| 2008/0012386 A1 | 1/2008 | Kano et al. |
| 2008/0023972 A1 | 1/2008 | Ohno et al. |
| 2008/0029932 A1 | 2/2008 | Zietlow et al. |
| 2008/0030031 A1 | 2/2008 | Nilsson |
| 2008/0036225 A1 | 2/2008 | Ji et al. |
| 2008/0041455 A1 | 2/2008 | Hsiao |
| 2008/0042454 A1 | 2/2008 | Garnweidner |
| 2008/0042455 A1 | 2/2008 | Nees |
| 2008/0048462 A1 | 2/2008 | Zabik |
| 2008/0054654 A1 | 3/2008 | Dahyabhai |
| 2008/0054655 A1 | 3/2008 | Kizaki et al. |
| 2008/0054656 A1 | 3/2008 | Guiles et al. |
| 2008/0061567 A1 | 3/2008 | Mae et al. |
| 2008/0067838 A1 | 3/2008 | Nakamae et al. |
| 2008/0067905 A1 | 3/2008 | Guiles |
| 2008/0073926 A1 | 3/2008 | Azzouz et al. |
| 2008/0088141 A1 | 4/2008 | Adachi et al. |
| 2012/0104775 A1* | 5/2012 | Marur ............... B60R 19/18 293/120 |
| 2014/0333077 A1* | 11/2014 | Kil ................... B60R 19/03 293/132 |

FOREIGN PATENT DOCUMENTS

| | | |
|---|---|---|
| GB | 1550100 A | 8/1979 |
| GB | 2033535 A | 5/1980 |
| JP | H09-240393 A | 9/1997 |
| WO | WO-1997/003865 A1 | 2/1997 |
| WO | WO-2001/000478 A1 | 1/2001 |

* cited by examiner

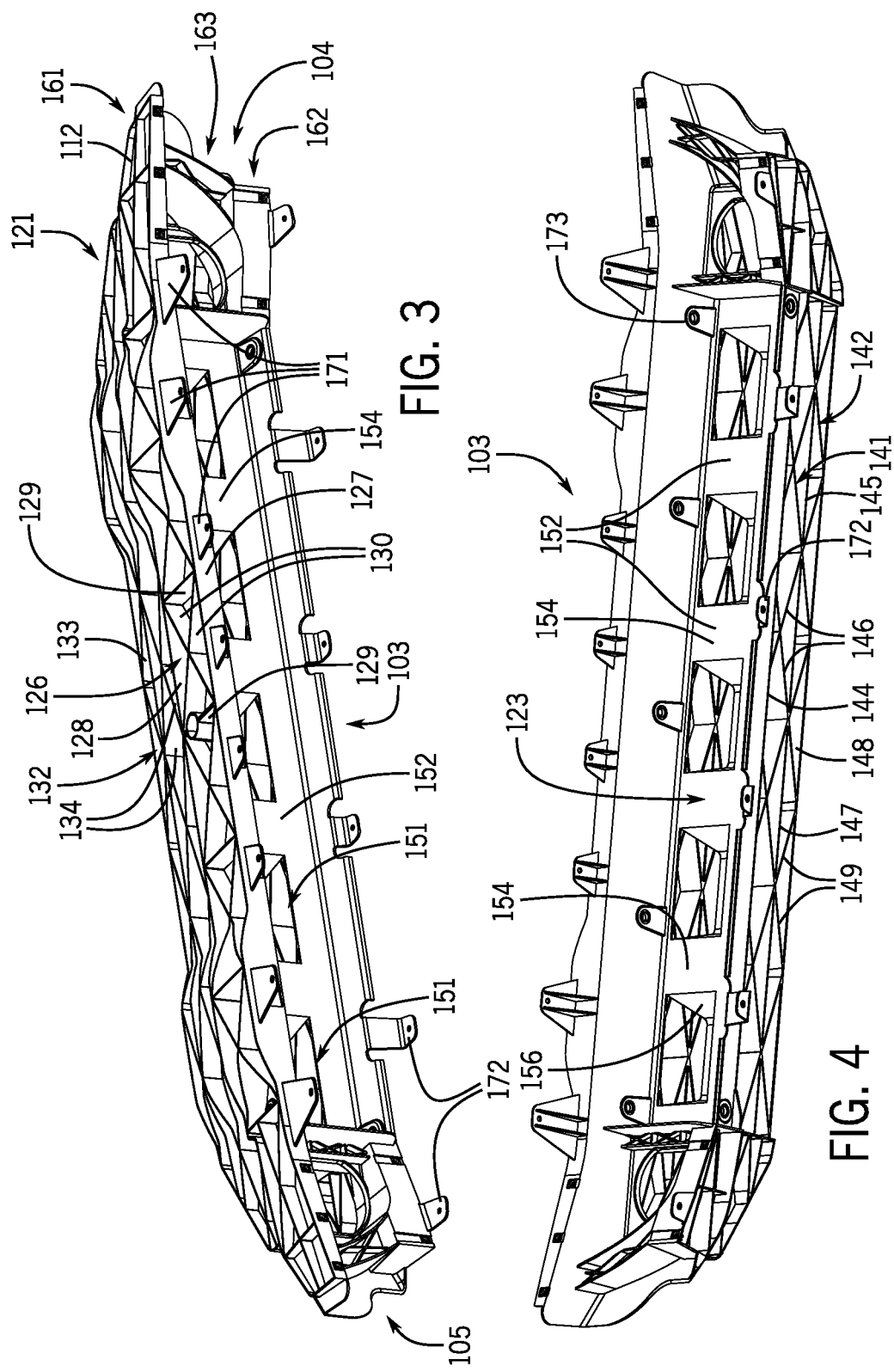

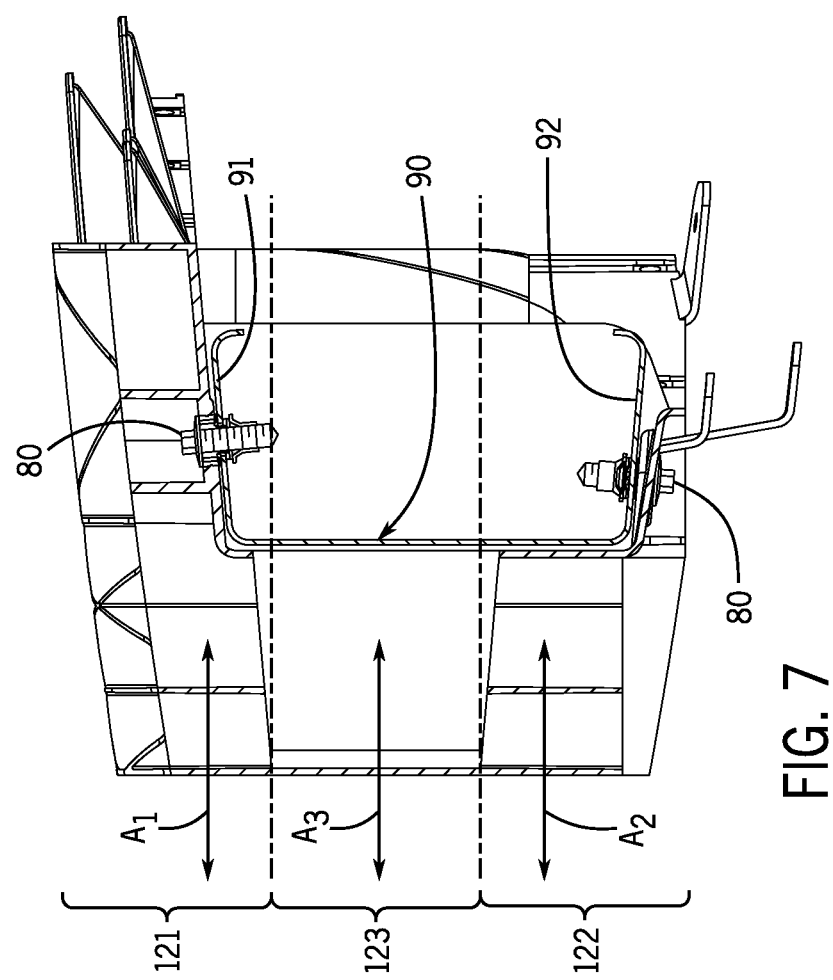

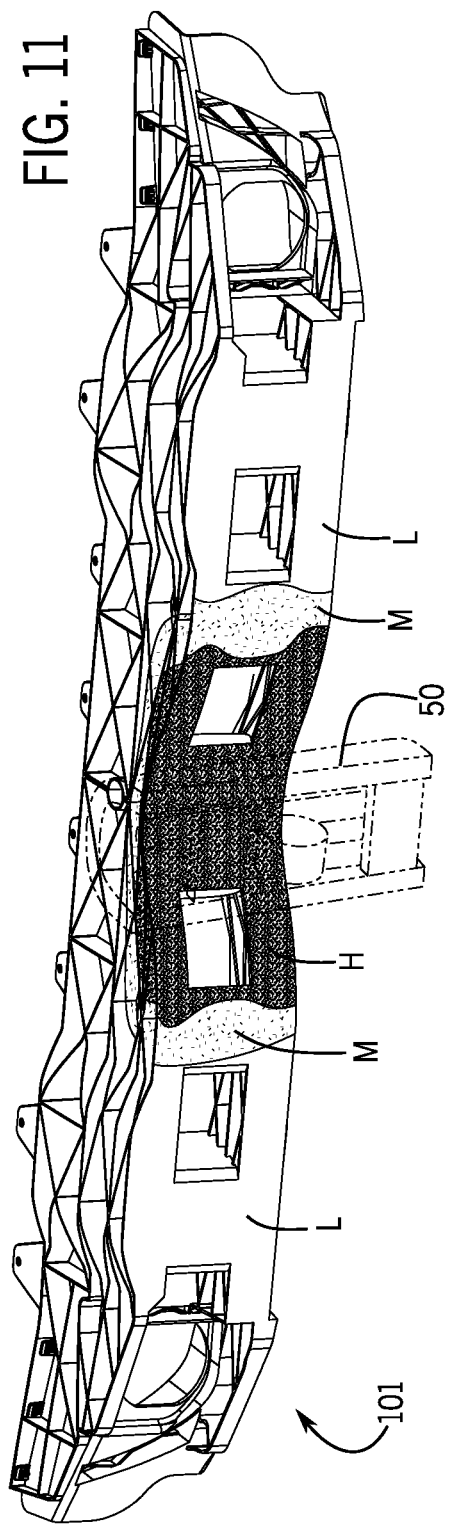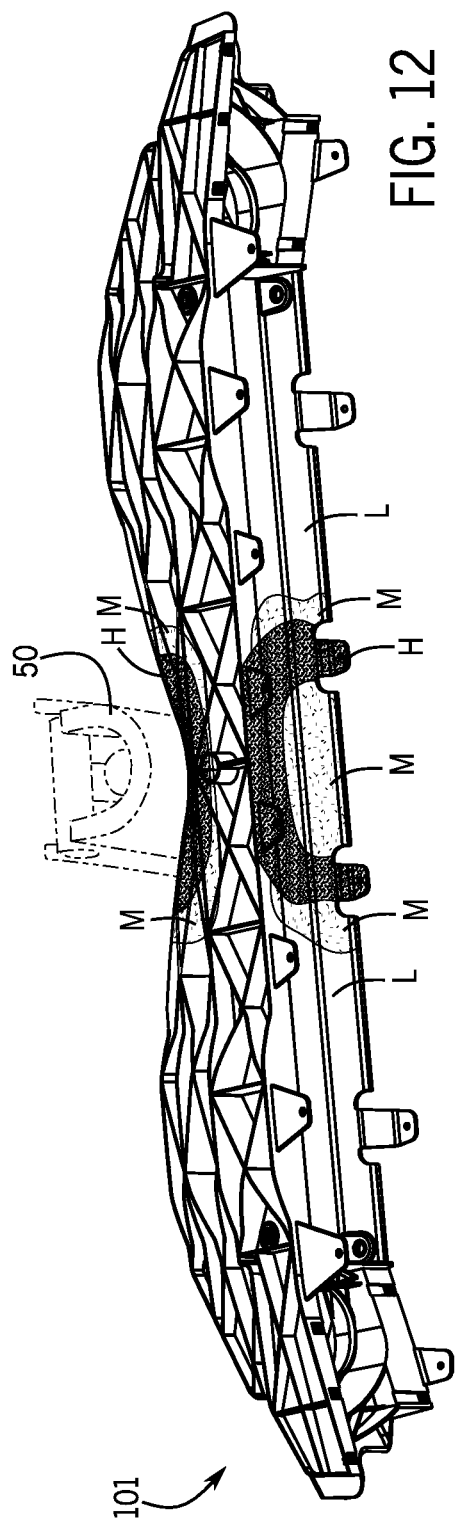

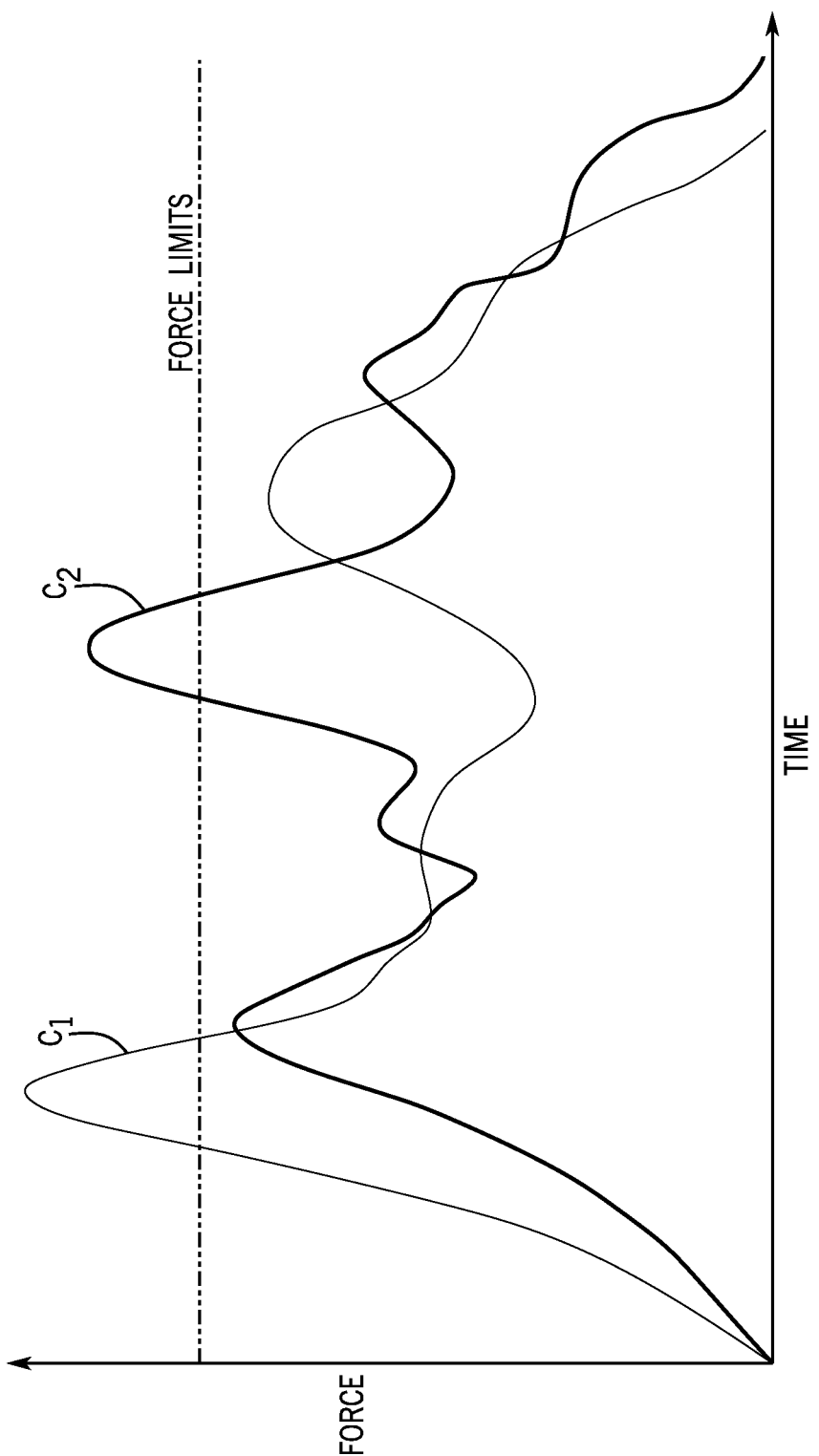

MULTI-LAYER ENERGY ABSORBER

CROSS-REFERENCE TO RELATED PATENT APPLICATIONS

This application claims the benefit of and priority to U.S. Provisional Patent Application No. 62/258,641, filed on Nov. 23, 2015, which is incorporated herein by reference in its entirety.

TECHNICAL FIELD

The present application relates generally to the field of bumpers for vehicles, such as motor vehicles, electric vehicles, and hybrid vehicles, that are configured to absorb energy during an impact in the area of the bumper. More specifically, this application relates to energy absorbers for use with bumpers for vehicles having more uniform structures to improve energy absorption.

BACKGROUND

Bumpers are typically provided on vehicles to provide energy management by way of absorbing energy during an impact between the bumper and another object. By absorbing energy during an impact, the bumper may reduce damage to other elements/parts of the vehicle during the collision and/or the object(s) impacted, such as when the object is a person (e.g., a pedestrian). Therefore, it is advantageous to improve the energy absorption performance of energy absorbers of bumper assemblies, such as, for example, during low speed impacts with pedestrians.

SUMMARY

One exemplary embodiment is directed to an energy absorber for use with a bumper assembly of a vehicle. The energy absorber includes a central portion provided between two opposite end portions in a longitudinal direction. The central portion is a multi-layer structure including an upper layer, a bottom layer, and an intermediate layer provided between the upper and lower layers. Each of the upper and lower layers are configured having a plurality of sets of members arranged forming meshed patterns. The intermediate layer includes alternating open and closed sections.

The central portion may include a unitary front face that interconnects the upper, the bottom, and the intermediate layers together, such that the plurality of sets of members of the first layer are directly connected together and the plurality of sets of members of the second layer are directly connected together. The central portion may be configured to be at least a majority of the energy absorber by way a mass and/or a distance (e.g., in the longitudinal direction).

One or more embodiments relate to an energy absorber for a vehicle bumper assembly that includes two end portions and a central portion provided between two end portions. The central portion is a multi-layer structure that includes a unitary front member, a first layer, a second layer, and a third layer. The unitary front member extends between the two end portions. The first layer includes a first plurality of members forming a first latticework structure having a first network of open sections between the first plurality of members. The first layer extends between the two end portions and between a rear member of the first layer and the unitary front member. The second layer includes a second plurality of members forming a second latticework structure having a second network of open sections between the second plurality of members. The second layer extends between the two end portions and between a rear member of the second layer and the unitary front member. The third layer is disposed between and interconnects the first and second layers.

The first layer may be a top layer, the second layer may be a bottom layer, and the third layer may include a third plurality of members forming a series of alternating open and closed sections between and interconnecting the first and second layers.

The third plurality of members may include a rear member and a plurality of fore and aft support members that are spaced apart from one another, so that one open section is formed between each pair of adjacent fore and aft support members. Each fore and aft support member may extend between the rear member of the third plurality of members and the unitary front member and may extend between a bottom of the top layer and a top of the bottom layer.

The energy absorber may include a metal impact beam, where the rear member of the third plurality of members is positioned closer to the unitary front member compared to the rear members of the first and second plurality of members to form a pocket that receives the metal impact beam. The pocket may be disposed between the bottom of the top layer and the top of the bottom layer.

The unitary front member may be generally planar.

The first plurality of members may include a plurality of sets of a first pattern of interconnected members arranged side by side in a lateral direction between the two end portions. Each set of the first pattern of interconnected members may include a first diagonal member aligned at a first oblique angle relative to the rear member of the first layer, and a second diagonal member interconnected with the first diagonal member and aligned at a second oblique angle relative to the rear member of the first layer. Each second diagonal member may be aligned at an angle relative to the associated first diagonal member. The first oblique angle may be equal to the second oblique angle. Each of the first and second diagonal members may be generally planar. Each set of first pattern of interconnected members may include at least one side member that extends from the rear member of the first layer toward the unitary front member between an end of the first diagonal member and an end of the second diagonal member.

The first plurality of members may include a plurality of sets of a second pattern of interconnected members arranged side by side in a lateral direction between the two end portions and between the first pattern of interconnected members and the unitary front member. Each set of the second pattern of interconnected members may include a third diagonal member aligned at a third oblique angle relative to the rear member of the first layer, and a fourth diagonal member interconnected with the third diagonal member and aligned at a fourth oblique angle relative to the rear member of the first layer. The third oblique angle may be equal to the fourth oblique angle, and the third oblique angle may be different than at least one of the first and second oblique angles. The energy absorber may include an intermediate member disposed between the first pattern of interconnected members and the second pattern of interconnected members, and the intermediate member may be generally parallel to at least one of the unitary front member or the rear member of the first layer. The second plurality of members may include a plurality of sets of a third pattern of interconnected members arranged side by side in a lateral direction between the two end portions. Each set of the third pattern of interconnected members may include a fifth diagonal member aligned at a fifth oblique angle relative to the rear member of the second layer, and a sixth diagonal member interconnected with the fifth diagonal member and aligned at a sixth oblique angle relative to the rear member of the second layer.

The second plurality of members may include a plurality of sets of a first pattern of interconnected members arranged side by side in a lateral direction between the two end portions. Each set of the first pattern of interconnected members may include a first diagonal member aligned at a first oblique angle relative to the rear member of the second layer, and a second diagonal member interconnected with the first diagonal member and aligned at a second oblique angle relative to the rear member of the second layer.

One or more embodiments relate to an energy absorber for use with an impact beam in a bumper assembly for a vehicle. The energy absorber includes a unitary front member; a first layer, and a second layer. The first layer has an open and closed latticework structure, and the first layer includes a plurality of a first pattern of members arranged side by side and located between a rear member of the first layer and the unitary front member Each of the first pattern of members may include a first diagonal member at a first angle relative to the rear member of the first layer, a second diagonal member interconnected with the first diagonal member and at a second angle relative to the rear member of the first layer, and at least one side member extending from the rear member of the first layer toward the unitary front member and extending between an end of the first diagonal member and an end of the second diagonal member. The second layer has an open and closed latticework structure, and the second layer includes a plurality of a second pattern of members arranged side by side and located between a rear member of the second layer and the unitary front member.

Each second pattern of members of the second layer may include a third diagonal member at a third angle relative to the rear member of the second layer, and a fourth diagonal member interconnected with the third diagonal member and at a fourth angle relative to the rear member of the second layer. At least one of the first and second layers may include a plurality of a third pattern of members arranged side by side and located between the rear member of the associated layer and the unitary front member. Each third pattern of members may include a fifth diagonal member aligned at a fifth angle relative to the rear member of the associated layer, a sixth diagonal member interconnected with the fifth diagonal member and aligned at a sixth angle relative to the rear member of the associated layer, and at least one intermediate member that extends between an end of the fifth diagonal member and an end of the sixth diagonal member. Each intermediate member may be generally parallel to at least one of the unitary front member or the rear member of the associated layer. The energy absorber may include a third layer disposed between and interconnecting the first and second layers. The third layer may include a rear member and a plurality of fore and aft support members that are spaced apart from one another and extend from the rear member of the third layer to the unitary front member to define a series of open and closed sections. Each open section may have an opening in the unitary front member, a pocket that is defined by the rear member opposite the plurality of fore and aft support members, and the pocket may be configured to receive and retain the impact beam.

One or more embodiments relate to an energy absorber for use with an impact beam in a bumper assembly for a vehicle. The energy absorber may include a first layer that includes a unitary front member, a unitary rear member, and a plurality of interconnected diagonal members forming a latticework structure that extends between the front and rear members of the first layer. Each diagonal member of the first layer is aligned obliquely relative to at least one of the front member or the rear member of the first layer. The energy absorber may include a second layer that includes a unitary front member, a unitary rear member, and a plurality of interconnected diagonal members forming a latticework structure that extends between the front and rear members of the second layer. Each diagonal member of the second layer is aligned obliquely relative to at least one of the front member or the rear member of the second layer.

The energy absorber may include a third layer disposed between the first and second layers. The front member of the first layer and the front member of the second layer may be unitary.

BRIEF DESCRIPTION OF THE DRAWINGS

FIG. 3 is a rear perspective view of the energy absorber shown in FIG. 1

FIG. 4 is another rear perspective view of the energy absorber shown in FIG. 1.

FIG. 7 is another sectional view showing that the vertical members may be configured to tailor the performance of the energy absorber.

FIG. 11 is a front perspective view of the energy absorber shown in FIG. 9, with meshing from finite element analysis to show relative stress/strain in the bumper during loading of the leg form.

FIG. 12 is a is a rear perspective view of the energy absorber shown in FIG. 11.

FIG. 15 is a graph illustrating force over time curves for a conventional energy absorber.

DETAILED DESCRIPTION

Referring generally to the Figures, disclosed in this application are energy absorbers for use with (or as) bumpers for vehicles to absorb energy during an impact in the area of the energy absorber. The energy absorbers disclosed in this application may be used on any type of vehicle, including but not limited to motor vehicles, electric vehicles, and hybrid vehicles. The energy absorbers may be configured having a more uniform structure, such as in a lateral (e.g., side to side, cross-car) axis of the vehicle, to better absorb energy from an impact between the EA and another object. The energy absorbers may be configured having a tunable performance, such as by tuning (e.g., reconfiguring, modifying, etc.) one or more vertical layers. It is noted that the tunability relates to modifying the EA in the design phase/process, such as to tailor the EA to a specific vehicle, not after the EA has been built (e.g., constructed, formed, manufactured, etc.). This arrangement may advantageously allow for more uniform and consistent performance, such as during low speed impacts (e.g., pedestrian impacts).

Energy absorbers having several separate longitudinal lobes extending outwardly along the lateral axis of the bumper/vehicle (e.g., the EA disclosed in U.S. Pat. No. 7,866,716) may provide reduced (e.g., uneven) performance, such as for pedestrian protection, as the leg form contacts the energy absorber (EA) at different locations. In other words, the forces can be very different depending upon whether the impact is in the middle of a lobe structure or centered over a side wall, a corner, or other location of a lobe structure of the energy absorber. Additionally, separate lobes may not distribute loads to other lobes efficiently.

According to an exemplary embodiment, a bumper assembly may include an energy absorber, an impact beam, and/or a fascia member. The energy absorber is configured to absorb energy (e.g., loading) during an impact to the bumper assembly. The energy absorber may be configured to mount to a vehicle, such as a frame member either directly or through one or more mounting members. The fascia member may be configured to cover (e.g., conceal from view) the energy absorber to provide improve aesthetics to the bumper assembly and the vehicle.

Figure 5:
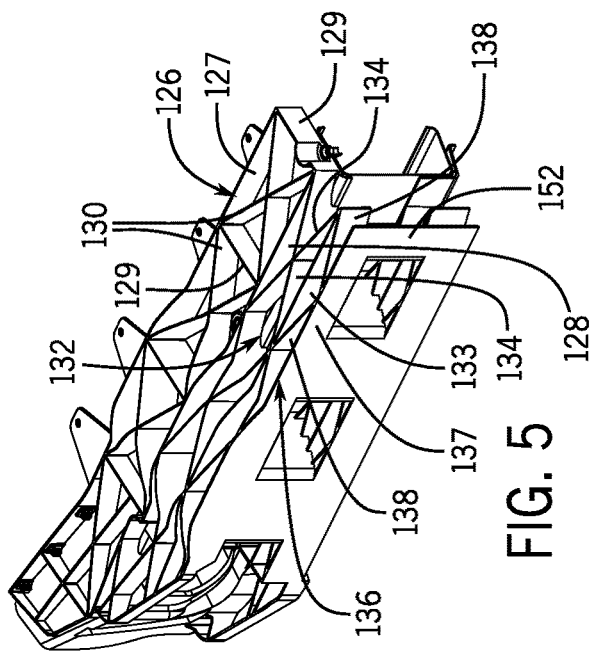
FIG. 5 is a perspective sectional view taken along line 5-5 in FIG. 1.
Figure 5A:
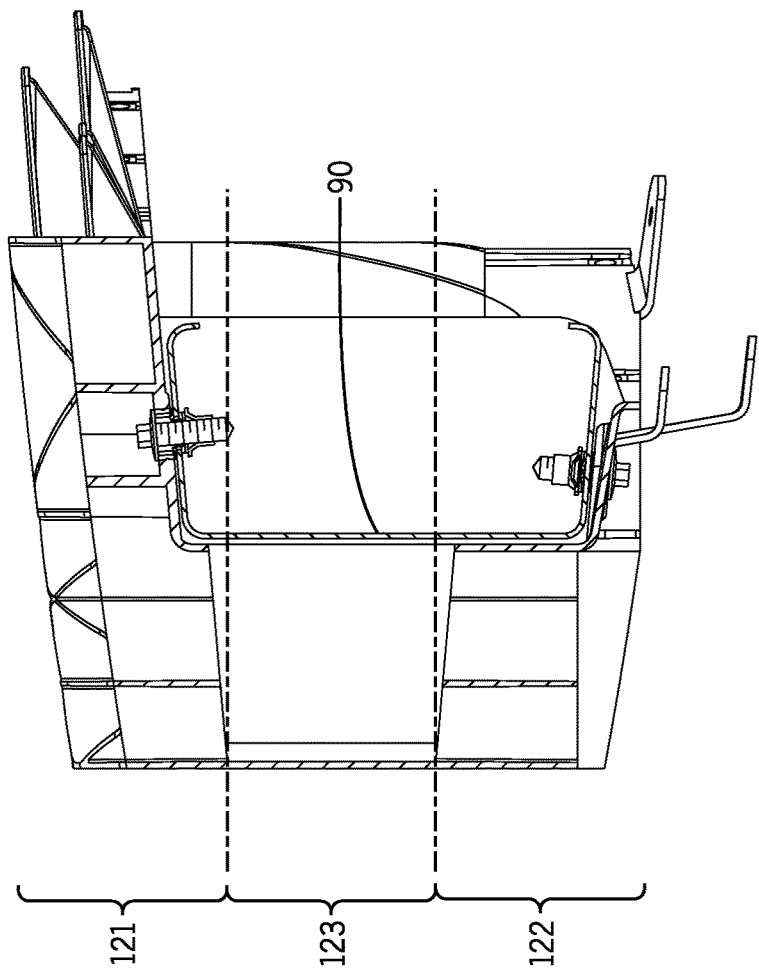
FIG. 5A is cross-sectional view taken along the same line 5-5 in FIG. 1.
Figure 6:
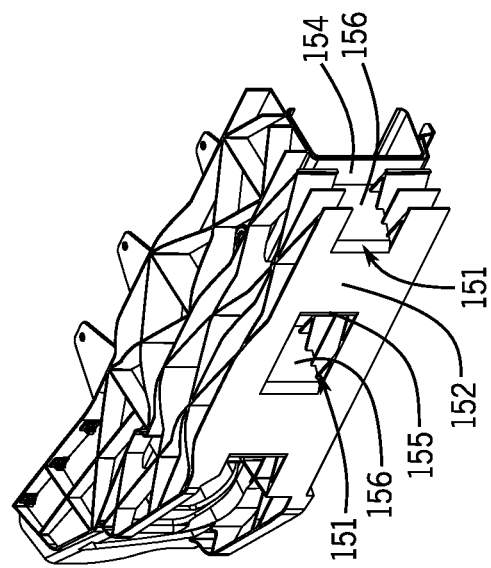
FIG. 6 is a perspective sectional view taken along line 6-6 in FIG. 1.
Figure 6A:
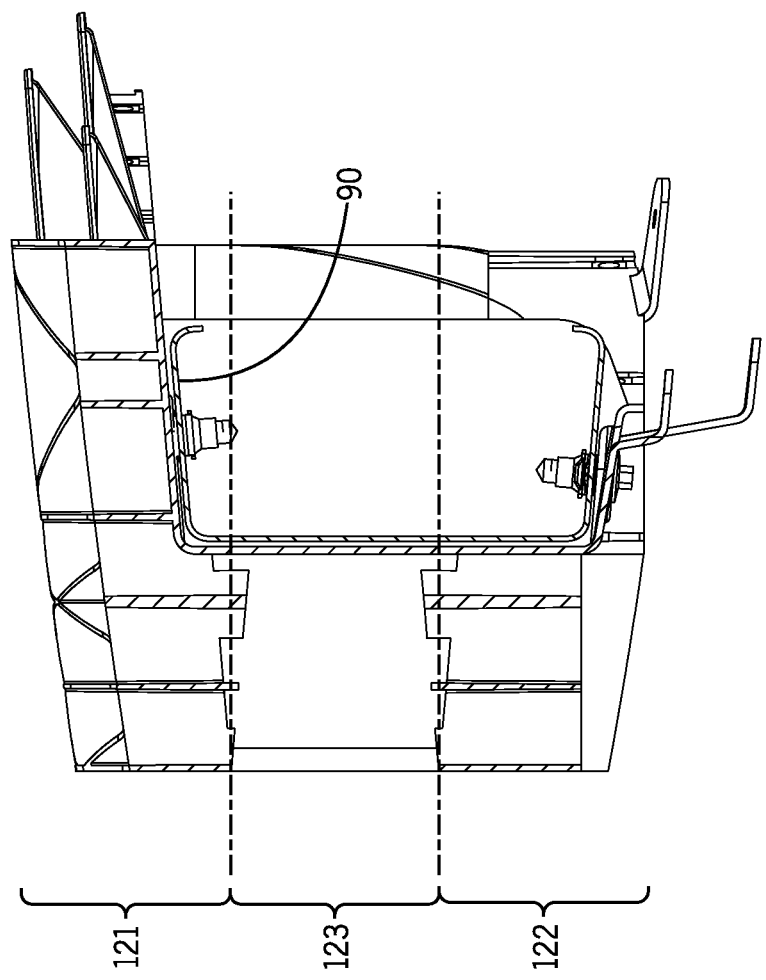
FIG. 6A is cross-sectional view taken along the same line 6-6 in FIG. 1.

FIGS. 5-7 illustrate an exemplary embodiment of an impact beam 90 for use with a bumper assembly. The beam 90 may be made of a metal (e.g., steel, aluminum, etc.) or other suitable relatively high strength material that is capable of withstanding the loading subjected to a bumper assembly during vehicle use. The beam 90 may have a cross-sectional shape that is advantageous for high loading (e.g., bending). For example, the beam 90 may have a generally C-shaped cross-section, as shown. According to other examples, the beam 90 may have a closed (e.g., box) cross-sectional shape, an I-shaped cross-section, a U-shaped cross-section, or other suitable shape. The impact beam 90 is configured to extend laterally (e.g., cross-car) to support the EA, such as during loading. For example, the impact beam 90 may be configured to nest in a channel in a rear portion of the EA, as shown in FIGS. 5-7. The impact beam 90 and the EA may be coupled together, such as through one or more fasteners (e.g., screws, bolts, rivets, etc.). As shown in FIG. 7, multiple fasteners 80 are used to fasten an upper flange 91 of the beam 90 to the EA and a lower flange 92 of the beam 90 to the EA.

FIGS. 1-6 illustrate an exemplary embodiment of an energy absorber 101 ("EA 101") for use with a bumper assembly. The EA 101 is generally configured as an elongated member having a width that is greater than a length (e.g., depth) and/or a height, where the width corresponds to a cross-car (e.g., lateral) direction of the vehicle (with which the EA will be used with), the length corresponds to a fore and aft (e.g., front to rear) direction of the vehicle, and the height corresponds to an up and down (e.g., vertical or generally vertical) direction of the vehicle. The specific sizes (e.g., width, length, height) of the EA 101 may be tailored to the specific application (e.g., vehicle).

Figure 1:
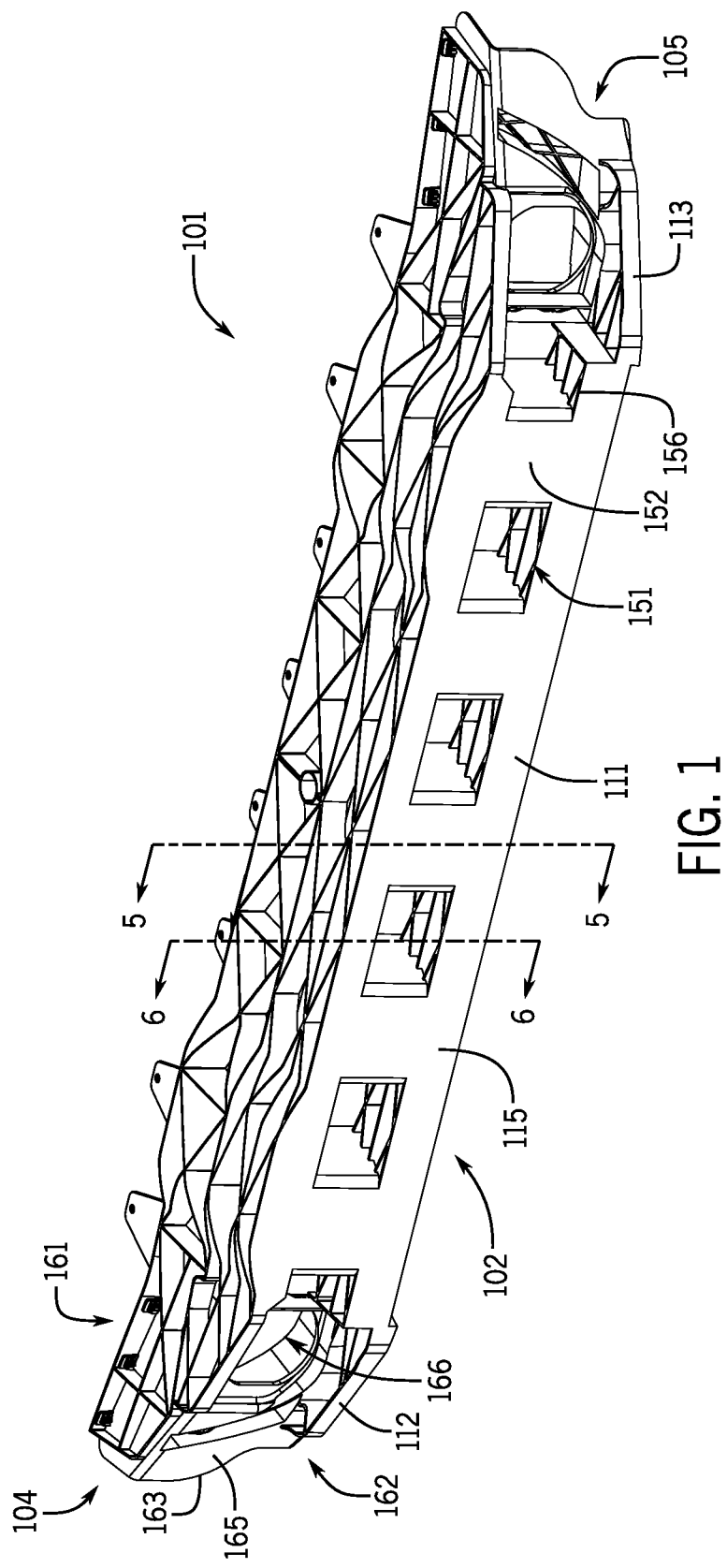
FIG. 1 is a front perspective view of an exemplary embodiment of an energy absorber for use with a bumper assembly.
Figure 2:
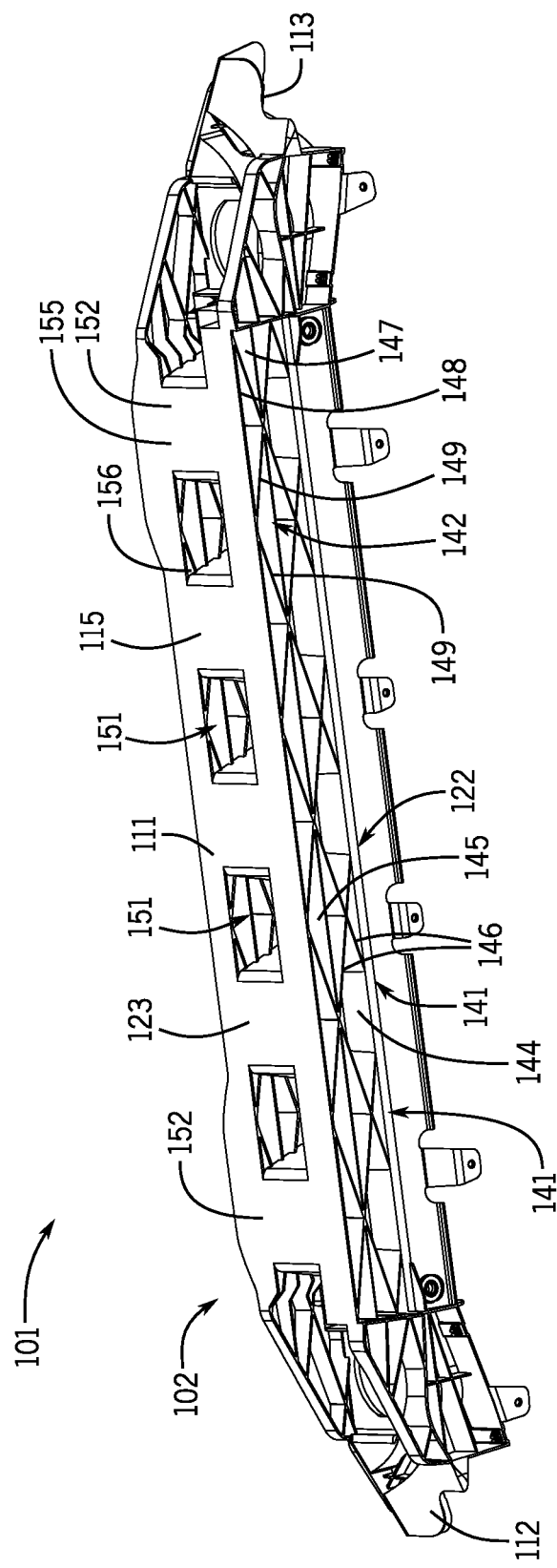
FIG. 2 is another front perspective view of the energy absorber shown in FIG. 1.

As shown best in FIGS. 1 and 2, the energy absorber 101 includes an exterior side 102 that is configured to face away from the vehicle, such as when the EA 101 is coupled (e.g., attached, mounted, etc.) to the vehicle. For example, the exterior side 102 may face forward when the energy absorber 101 is used with a front bumper assembly of a vehicle. Also for example, the exterior side 102 may face rearward when the energy absorber 101 is used with a rear bumper assembly of a vehicle.

As shown best in FIGS. 3 and 4, the EA 101 includes an interior side 103 that is configured to face toward the vehicle, such as when the EA 101 is coupled to the vehicle. The EA 101 also includes a right side 104 and a left side 105, which may correspond to sides of the vehicle, such as, for example, a passenger side and a driver side of the vehicle, respectively.

The EA 101 may include a first (e.g., central) portion 111 provided between a second (e.g., end) portion 112 and a third (e.g., end) portion 113. The first portion 111 may constitute a greater percentage (i.e., greater than 50%) of the EA 101 by way of size (e.g., length, width, height) and/or mass compared to the second and third portions 112, 113. According to an exemplary embodiment, the first portion 111 constitutes as least 60% (sixty percent) of the width and/or mass of the EA 101. According to another exemplary embodiment, the first portion 111 constitutes as least 70% (seventy percent) of the width and/or mass of the EA 101. According to yet another exemplary embodiment, the first portion 111 constitutes as least 80% (eighty percent) of the width and/or mass of the EA 101. Since the first portion 111 may be configured to absorb and disperse more energy, such as from a low speed pedestrian impact, compared to the end portions, the EA 101 may advantageously provide an improved (e.g., more uniform and consistent) performance the greater the percentage of the first portion is compared to the end portions.

The first portion 111 of the EA 101 may be configured as a generally uniform structure, meaning that the first portion 111 may be a unitary member that is configured to provide a generally uniform (e.g., the same or very similar) impact performance (e.g., energy absorption and dispersion of energy) along its entire width. The first portion 111 may include a front and/or a rear face configured as a one-piece generally planar member that acts to distribute load across a much larger area (e.g., surface area, cross-sectional, etc.). Thus, the EA 101 is configured to provide a generally uniform impact performance for an impact at any point along, for example, the exterior side 102 of the first portion 111.

According to an exemplary embodiment, the first portion 111 of the EA 101 is configured as a multi-layer structure. As shown best in FIGS. 5 and 6, the first portion 111 includes three layers, which include a first (e.g., top, upper, etc.) layer 121, a second (e.g., bottom, lower, etc.) layer 122, and a third (e.g., middle, intermediate) layer 123 disposed between the first and second layers 121, 122. For example, the first layer 121 may be directly above the third layer 123, and the second layer 122 may be directly below the third layer 123, such that the third layer 123 is sandwiched between the first and second layers 121, 122.

The first layer 121 of the first portion 111 includes a networking of closed and open sections (e.g., mesh, meshing, lattice, latticework, etc.) that generally extends between the end portions 112, 113 and between the exterior and interior sides 102, 103 of the EA 101. The network of meshing of the first layer 121 may include a plurality of members that are interconnected to form a pattern having one or more interstices between two or more of the members. The first layer 121 may include a single repeating pattern of members or may include a plurality of patterns of members.

As shown best in FIGS. 1, 3, and 5, the first layer 121 includes several patterns of members moving from the interior side 103 to the exterior side 102 of the EA 101. For example, a first pattern of meshed members 126 of the first layer 121 includes a rear member 127, a front member 128 spaced apart from the rear member 127, a pair of spaced apart side members 129, and at least one diagonal member 130 extending between the front and rear members and/or the side members. The front member 128, the rear member 127, and the side members 129 may form a generally rectangular frame and the diagonal members 130 may extend between the each pair of opposing corners of the frame. The term "generally rectangular" denotes that one or more of the members (e.g., front, rear, diagonal) may be configured having a non-linear shape (e.g., curved, wavy, arcuate, etc.); however, if the non-linear shaped members were modified to be linear, the overall appearance of the shape would be rectangular or square. The members may form other shapes, such as, for example, any polygonal shape (e.g., hexagonal, octagonal, etc.), triangular shape, circular shape, or other suitable shapes defining interstices.

The first pattern of meshed members 126 may be repeated, for example, extending laterally across at least a portion of the width of the first layer 121, such that multiple sets of members are provided in a side by side arrangement. In other words, the arrangement of the members may be repeated as more than one set to form a pattern, such as a pattern that extends in a lateral direction of the EA 101. When repeated, one side member 129 of a first set of members may be a side member in a second, adjacent, set of members. Also when repeated, the rear member 127 and/or front member 128 may extend laterally across at least a portion of the width of the first layer 121, such that the front member and/or the rear member is a unitary element that is shared by all of the sets of members. By way of example, when the front member 128 is a unitary element/member, each set of adjacent members shares the front member, thereby dividing the front member 128 into sections where each set of members has a section of the front member 128 as its front member.

Openings (e.g., interstices, voids, etc.) are provided between the members of the first pattern of meshed members 126. For example, a first (e.g., generally triangular) opening may be provided between the rear member 127 and the diagonal members 130, a second (e.g., generally triangular) opening may be provided between the front member 128 and the diagonal members 130, a third (e.g., generally triangular) opening may be provided between one side member 129 and the diagonal members 130, and a fourth (e.g., generally triangular) opening may be provided between the other side member 129 and the diagonal members 130. The openings allow for the EA 101 to deform (e.g., crumple, crush, etc.), such as plastically during impact to absorb energy in the process. It is noted that the first pattern of meshed members 126 of the first layer 121 may not crush as much as the more forward facing meshed members when the first pattern of meshed members 126 are provided above the impact beam 90 (e.g., the upper flange 91).

According to another example, a second pattern of meshing (e.g., meshed members) of the first layer may include a rear member, a front member spaced apart from the rear member, and one or more diagonal members extending between the front and rear members. As shown in FIGS. 3 and 5, the second pattern of meshed members 132 of the first layer 121 includes a rear member (that may be the front member 128 of the first pattern of meshed members 126), a front member 133, and a pair of diagonal members 134 that form a generally cross-shaped design (e.g., an "x" shape, a "+" shape, etc.). The second pattern of meshed members 132 may be located forward of the first pattern of meshed members 131 (e.g., closer to the exterior side 102), may be located lateral to the first pattern, or have another suitable arrangement relative to the first portion. The second pattern of meshed members 132 includes openings (e.g., interstices, voids, etc.) provided between its various members to allow for the EA 101 to deform, such as plastically during impact to absorb energy in the process. For example, a first opening may be provided between the rear member and the diagonal members of the second pattern of meshed members 132. Also for example, a second opening may be provided between the front member and the diagonal members of the second pattern of meshed members 132. Also for example, additional openings may be provided between diagonal members of two adjacent sets of members of the second pattern of meshed members 132. The arrangement of the members may be repeated, such as, for example, as interconnected sets that extend in the lateral direction forming the second pattern.

For the example having the second pattern of meshing provided forward of the first pattern of meshing, the spacing between the front and rear members may be the same, similar, or different between the first and second patterns. As shown in FIG. 5, a spacing (e.g., distance) between the rear member 127 and the front member 128 of the first pattern of meshed members 126 is greater than a spacing between the rear member (e.g., the front member 128) and the front member 133 of the second pattern of meshed members 132. This arrangement may lead to the diagonal members being configured at different angles relative to the front/rear members for the first and second patterns. For example, the spacing between the front and rear members of the second pattern of meshed members 132 may be smaller than the spacing between the front and rear members of the first pattern of meshed members 126. Thus, each diagonal member 134 of the second pattern form a more acute (e.g., smaller) angle with the front and rear members of the second pattern of meshed members 132, compared to the angle formed between the diagonal member 130 and the front/rear members of the first pattern of meshed members 126. This arrangement may advantageously tailor the load absorption and dispersion of the EA 101. For example, the second pattern of meshed members 132 may be configured to absorb a lower relative load compared to the first pattern of meshed members 126.

According to another example, the first layer may include a third pattern of meshing (e.g., meshed member) having a rear member, a front member spaced apart from the rear member, and one or more diagonal members extending between the front and rear members. As shown in FIG. 5, the third pattern of meshed members 136 of the first layer 121 includes a rear member, which may be the front member 133 of the second pattern of meshed members 132, a front member 137, and a pair of diagonal members 138 that form a generally "v" shape (e.g., a "v" shape, an inverted "v" shape, etc.). The third pattern of meshed members 136 may be located forward of the first pattern of meshing (e.g., closer to the exterior side 102), lateral to the first pattern, or have another suitable arrangement. Also shown, the spacing between the rear member (e.g., the front member 128) and the front member 133 of the second pattern of meshed members 132 is greater than a spacing between the rear member (e.g., the front member 133) and the front member 137 of the third pattern of meshed members 136. This arrangement may lead to the diagonal members of the third pattern being configured at different angles relative to the front/rear members when compared to the diagonal members of the first and second patterns. Again, this arrangement may advantageously tailor the load absorption and dispersion of the EA 101. For example, the third pattern of meshed members 136 may be configured to absorb a lower relative load and/or deform at a lower relative load compared to the second pattern of meshed members 132, which in-turn may be configured to absorb a lower relative load and/or deform at a lower relative load compared to the first pattern of meshed members 126.

The first layer 121 may be configured having other patterns of meshing. For example, the first layer 121 may include one or more polygonal patterns of meshing. Also for example, the first layer 121 may include one or more rectangular or square patterns of meshing, such as without including any diagonal members. Also for example, the first layer 121 may include one or more triangular patterns of meshing. As yet another example, the first layer 121 may include one or more circular patterns of meshing. It is noted that these examples of patterns of meshing of the first layer 121 are not limiting, and the first layer 121 may include other patterns. The first layer 121 may also help manage step loads imparted into the bumper assembly/EA. Thus, in addition to absorbing energy upon frontal loading, such as by crushing upon impact, the first layer 121 may also absorb energy in a transverse direction from step loads.

The second layer 122 of the first portion 111 of the EA 101 includes a networking of closed and open sections (e.g., mesh, meshing, lattice, latticework, etc.) that generally extends between the end portions 112, 113 and between the exterior and interior sides 102, 103 of the EA 101. The network of meshing of the second layer 122 may include a plurality of members that are interconnected to form a pattern having one or more interstices between two or more of the members. The second layer 122 may include a single repeating pattern of members or may include a plurality of different patterns of members. The members of the second layer 122 may form different configurations compared to the members of the first layer 121, which may advantageously make the EA more tunable from a design perspective with respect to the load carrying capability and energy absorption during loading.

As shown best in FIGS. 2 and 4, the second layer 122 includes a first (e.g., inner) pattern of meshed members 141 and a second (e.g., outer) pattern of meshed members 142 (moving from the interior side 103 to the exterior side 102 of the EA 101). In other words, the second pattern of members 142 may be located closer to an object impacting the bumper and/or the EA 101, while the first pattern of members 141 may be located closer to the vehicle to which the EA 101 is mounted to. Each of the first and second patterns of meshed members 141, 142 includes a plurality of interconnected members. Each of the first and second patterns of meshed members 141, 142 may be configured the same as, similar to, or different than the first, second, or third patterns of meshed members 126, 132, 136 of the first layer 121 of the EA 101.

As shown in FIGS. 2 and 4, the first pattern of meshed members 141 of the second layer 122 includes a rear member 144, a front member 145, and a plurality of diagonal members 146 extending between the front and rear members 145, 144. The front member 145 may be spaced apart from the rear member 144 by a distance of separation, in which the diagonal members 146 are located. For example, the front member 145 may be generally parallel to the rear member 144. The diagonal members 146 may be interconnected with the front member 145, the rear member 144, and/or other diagonal members 146. As shown, the diagonal members 146 form an "x" shape between the rear and front members 144, 145, with interstices located between the members.

The first pattern of meshed members 141 of the second layer 122 may include additional elements/members. For example, side members may be provided spanning between the rear and front members 144, 145, such as to form a generally rectangular frame, with the diagonal members 146 extending between the corners of the frame. Also for example, cylindrical, polygonal, or other shaped members may be included in the first pattern of meshed members 141.

The first pattern of meshed members 141 may be repeated. In other words, the second layer 122 of the EA 101 may include a plurality of the first pattern of meshed members 141 (e.g., a plurality of sets of meshed members 141). For example, a plurality of the first pattern of meshed members 141 may extend laterally across at least a portion of the width of the second layer 122, such that multiple sets of members are provided in a side by side arrangement. Each adjacent set of members 141 may be interconnected to form the uniform structure of the EA 101. For example, the rear member 144 and/or the front member 145 may extend laterally across at least a portion of the width of the second layer 122, such that the front member and/or the rear member is a unitary element that is shared by at least a portion the sets of member. As shown in FIG. 2, each of the front and rear members 145, 144 is a unitary element that extends the entire width of the first portion 111 of the EA 101. Thus, all of the sets of the members 141 share the front member 145 and the rear member 144, with each set of members 141 including associated portions of the front and rear members 145, 144.

As shown in FIGS. 2 and 4, the second pattern of meshed members 142 of the second layer 122 includes a rear member 147 (e.g., which may be the front member 145 of the first pattern of meshed members 141), a front member 148, and at least one diagonal member 149 extending between the front and rear members 148, 147. The front member 148 may be spaced apart from the rear member 147 by a distance of separation, in which each diagonal member 149 is located. For example, the front member 148 may be generally parallel to the rear member 147. Each diagonal member 149 may be interconnected with the front member 148, the rear member 147, and/or one or more other diagonal members 149. As shown, each pair of diagonal members 149 form a generally "v" shape (e.g., a "v" shape, an inverted "v" shape, etc.) between the rear and front members 147, 148, with interstices located between the members.

The second pattern of meshed members 142 may include additional elements/members. For example, side members may be provided spanning between the rear member 147 and the front member 148, such as to form a generally rectangular frame, with the diagonal members 149 extending between the corners of the frame. Also for example, cylindrical, polygonal, or other shaped members may be included in the second pattern of meshed members 142.

The second pattern of meshed members 142 may be repeated. In other words, the second layer 122 of the EA 101 may include a plurality of the second pattern of meshed members 142 (e.g., a plurality of sets of meshed members 142). For example, a plurality of the second pattern of meshed members 142 may extend laterally across at least a portion of the width of the second layer 122, such that multiple sets of members are provided in a side by side arrangement. Each adjacent set of members 142 may be interconnected to form the uniform structure of the EA 101. For example, the rear member 147 and/or the front member 148 of the second layer 122 may extend laterally across at least a portion of the width of the second layer 122, such that the front member and/or the rear member is a unitary element that is shared by at least a portion the sets of member. As shown in FIG. 2, each of the front and rear members 148, 147 is a unitary element that extends the entire width of the first portion 111 of the EA 101. Thus, all of the sets of the members 142 share the front member 148 and the rear member 147, with each set of members 142 including associated portions of the front and rear members 148, 147.

Additionally, the patterns of meshed members of the second layer 122 may be interconnected to form the uniform structure of the EA 101. For example, the first pattern of meshed members 141 and the second pattern of meshed members 142 may be interconnected to form a uniform structure (e.g., a unitary structure). As shown, the front member of the first pattern of meshed members 141 may also be the rear member of the second pattern of meshed members 142 to interconnect the sets of members together into a unitary structure.

The second layer 122 may include additional patterns (e.g., sets) of meshed members, which may be interconnected with the first and second patterns of meshed members 141, 142. For example, a third pattern of meshed members may be provided forward of the second pattern of meshed members 142, where the third pattern of meshed members may be configured having a plurality of members. The plurality of members may be arranged similar to, the same as, or different than any other pattern of members disclosed in this application.

The third layer 123 of the first portion 111 of the EA 101 is configured to interconnect the first and second layers 121, 122. As noted the third layer 123 is sandwiched between the first and second layers 121, 122. The third layer 123 includes a plurality of members. As shown in FIGS. 1-6, the plurality of members of the third layer 123 forms a series of alternating open sections 151 and closed sections 152. In other words, the third layer 123 is an undulating structure that alternates between open and closed sections. The third layer 123 may include any number of open and closed sections, which may be tailored to the width of the EA 101. As shown, the third layer 123 includes five closed sections 152 and six open sections 151, with four of the open sections 151 located between two adjacent pairs of closed sections 152. The two outboard most open sections 151 may be located between a closed section 152 of the first portion 111 and one of the end portions 113 of the EA 101.

Each closed section 152 of the third layer 123 includes one or more members. As shown, each closed section includes a rear member 154, a front member 155, and two side members 156 interconnecting the front and rear members. For example, each side member 156 may extend between the front and rear members 155, 154 to form a generally box (e.g., rectangular, square, etc.) section. The central portion of the box section (e.g., the space between the members) may be open.

As shown in FIGS. 1-6, the first layer 121 is provided directly above (e.g., on top of) the third layer 123, and the second layer 122 is provided directly below the third layer 123. The first and second layers are generally uniform and stabilize the undulating intermediate (third layer) during loading to disperse contact loads across the (uniform) first and second layers of the structure of the first portion 111 of the EA 101. The upper and lower rib meshes (e.g., the members forming the patterns of meshed members that make up the first and second layers 121, 122) are configured to disperse the energy laterally during an impact into the surrounding structure of the EA 101 and stabilize the middle undulating structure of the third layer 123. FIGS. 5 and 6 illustrate the three layers, which are labeled as the "top 'rib mesh' layer" (i.e., the first layer 121), the "middle 'undulating' layer" (i.e., the third layer 123), and the "bottom 'rib mesh' layer" (i.e., the second layer 122). This arrangement may advantageously allow the EA 101 (e.g., the third layer 123) to column collapse without folding over to maximize the amount of energy absorbed by the EA 101 during the impact. The force curves shown in FIGS. 15 and 16 help illustrate the advantages in energy absorption of the EAs of this application. These curves are discussed in more detail below.

Also shown in FIGS. 2 and 5, the front member 148 of the second pattern of meshed members 142 of the second layer 122 and the front member 137 of the third pattern of meshed members 136 of the first layer 121 may each form a portion of a front face 115 of the first portion 111 of the EA 101. Additionally, the front member 155 of each closed section 152 of the third layer 123 may form a portion of the front face 115 of the first portion 111 of the EA 101. According to one example, the front face 115 is a single unitary element that includes the front members 137 of the first layer 121, the front members 148 of the second layer 122, and the front members 155 of the third layer 123. The unitary element may be generally planar or may be curved (e.g., arcuate). According to other examples, the front members of the various layers may be offset (e.g., in a fore and aft direction) from other front members.

The end (e.g., second) portion 112 of the EA 101 extends from an end of the first portion 111 of the EA 101. As shown, the end portion 112 has a generally triangular shape (when viewed from above or below the EA 101) and forms a much smaller percentage of the overall size of the EA (e.g., width, mass) compared to the first portion 111. The end portion 112 may include one or more layers. For example, the end portion 112 may include a first layer 161 (e.g., an upper layer), a second layer 162 (e.g., a lower layer), and a third layer 163 (e.g., an intermediate layer sandwiched between the first and second layers) as shown in FIG. 3.

Figure 14:
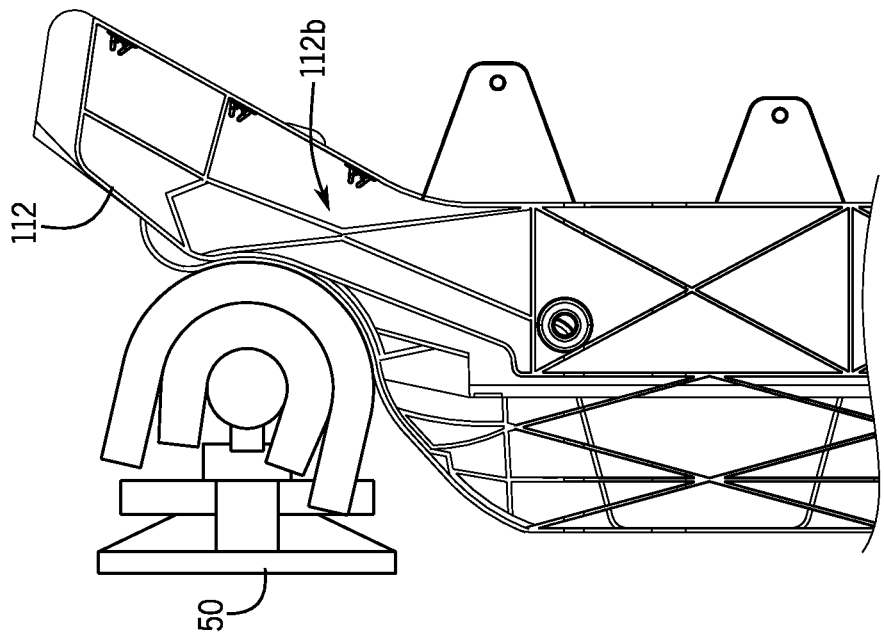
FIG. 14 is a top view of the energy absorber shown in FIG. 1, with a leg form loading the energy absorber in an end section.
Figure 13:
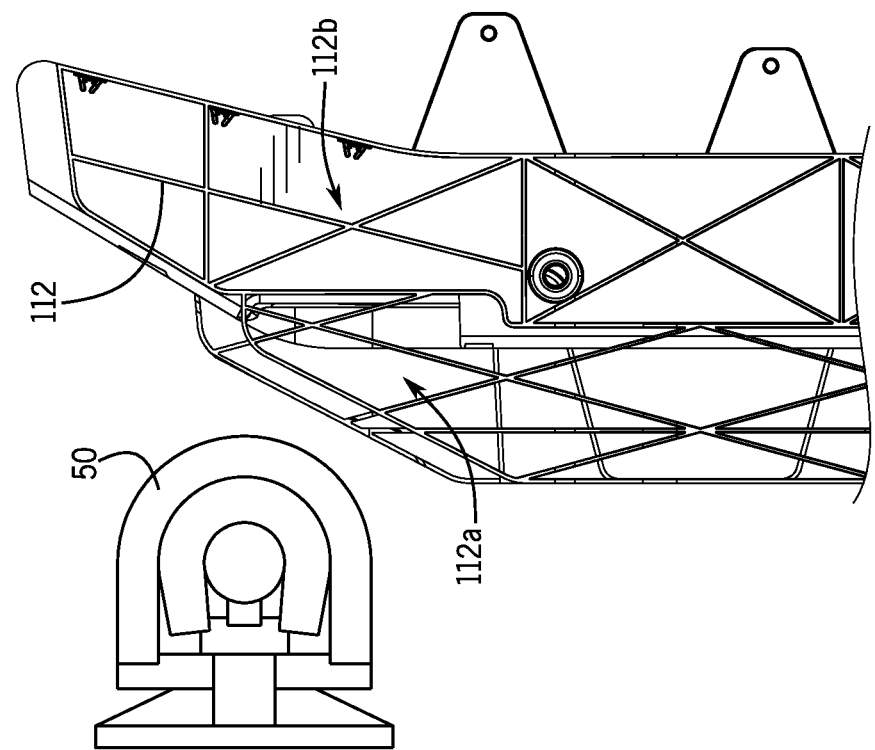
FIG. 13 is a top view of the energy absorber shown in FIG. 1, with a leg just prior to loading the energy absorber in an end section.

FIGS. 13 and 14 illustrate pre and post loading of an end portion 112 of the EA 101 by a leg form 50. The design of the end portions 112 may advantageously crush during a first stage of load, then deflect during a second stage of loading to absorb more energy from the impact of the leg form 50. In contrast, other EAs that include an impact beam positioned behind (e.g., rearward) of the end portion 112 tend to transfer load without deflecting due to the impact beam. Thus, other such EAs transfer relatively higher loads into the leg form 50 (e.g., the occupant).

Each of the first and second layers 161, 162 may include two or more members (e.g., a plurality of members forming a pattern of members) that are interconnected to define one or more openings (e.g., interstices) located between two or more of the members. As non-limiting examples, each layer 161, 162 may include any combination of the patterns of members discussed in this application.

As shown in FIG. 1, the third layer 163 of the end portion 112 of the EA 101 includes an outer section 165 that defines an open section 166. The outer section 165 may extend between the first and second layers 161, 162 to define the open section 166. The outer section 165 may include one or more members having any suitable shape.

The end (e.g., third) portion 113 of the EA 101 may be configured similar to, the same as, or different than the other end portion 112 of the EA 101. As shown, the third portion 113 is configured substantially symmetrically opposite to the second portion 112 of the EA 101. Thus, the end portion 113 is not described in more detail here, since the features of the end portion 112 are applicable to the end portion 113.

The EA 101 may include features/elements that are configured to couple the EA to another object, such as a frame element/member of a vehicle. As shown best in FIGS. 3 and 4, the EA 101 includes a plurality of attachment features, including upper attachment members 171 extending from a rear surface of the first layer 121 and lower attachment members 172 extending from a rear surface of the second layer 122. The EA 101 may include additional attachment members 173 extending from a rear surface of the third layer 123.

As shown in FIG. 7, each of the vertical layers (e.g., the members extending generally vertical in the one or more layers of the EA) may be reconfigured for different applications. For example, the front face (e.g., the front members of the one or more layers) may be moved or relocated during the design phase, such as in a forward direction (e.g., relative to the vehicle) to increase the depth of the EA 101 to influence the energy absorption of the EA. By moving the front face forward, one or more additional patterns of members may be added to, for example, the top and bottom layers of the EA to change the impact performance of the EA when built. Alternatively, the same number of patterns of members may be employed, but the relative spacing between certain members (e.g., front and rear members) may be increased to influence the energy absorption. Also for example, the front face of the EA may be moved in a rearward direction (in the design phase) to decrease the depth of the EA to influence the energy absorption of the EA.

According to one example, the front member of all three layers 121, 122, 123 may be moved (e.g., forward, rearward) along the arrows A1, A2, A3 to influence the performance of the EA. According to other examples, the front member of the top layer 121 (e.g., first layer) may be moved along the arrow A1 to increase/decrease the size of the first layer 121, and/or the bottom layer 122 (e.g., second layer) may be moved along the arrow A2 while the middle layer 123 (e.g., third layer) may remain in the same location (i.e., not moved). According to other examples, any combination of front members may be moved to influence the performance of the EA. Again, as noted, the performance of the EA may be tailored by moving or relocating elements/members of the EA during the design phase, not after the EA is formed.

Figure 8:
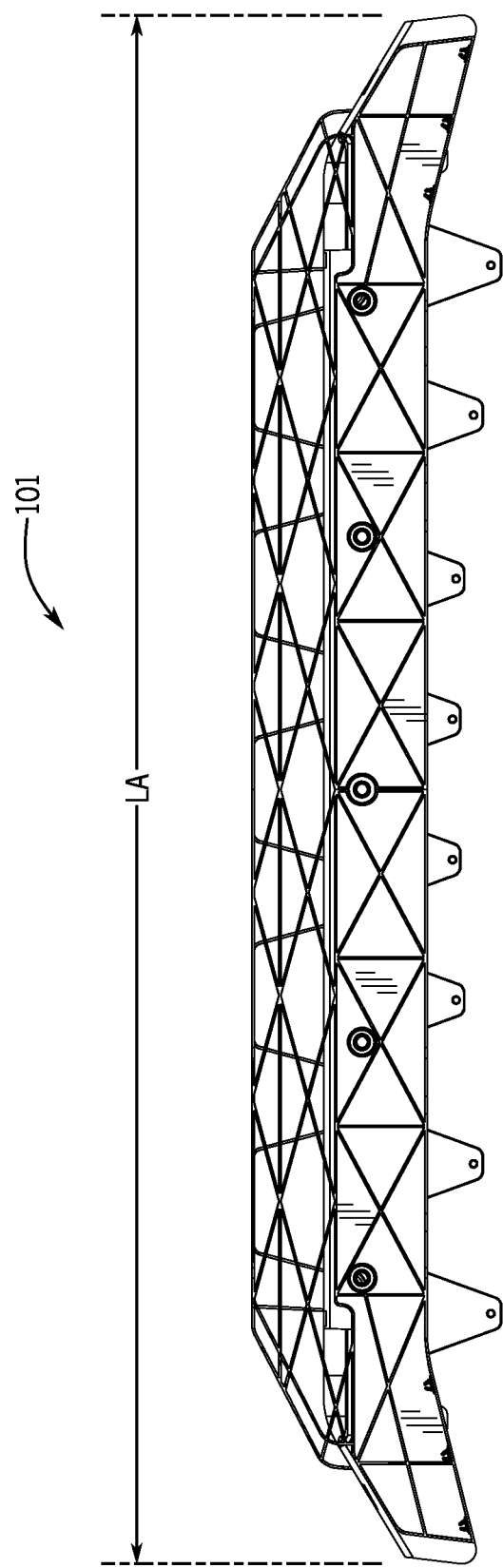
FIG. 8 is a top view of the energy absorber shown in FIG. 1, with a front portion of the energy absorber meshed to illustrate its energy absorption using a finite element analysis (FEA) model.
Figure 9:
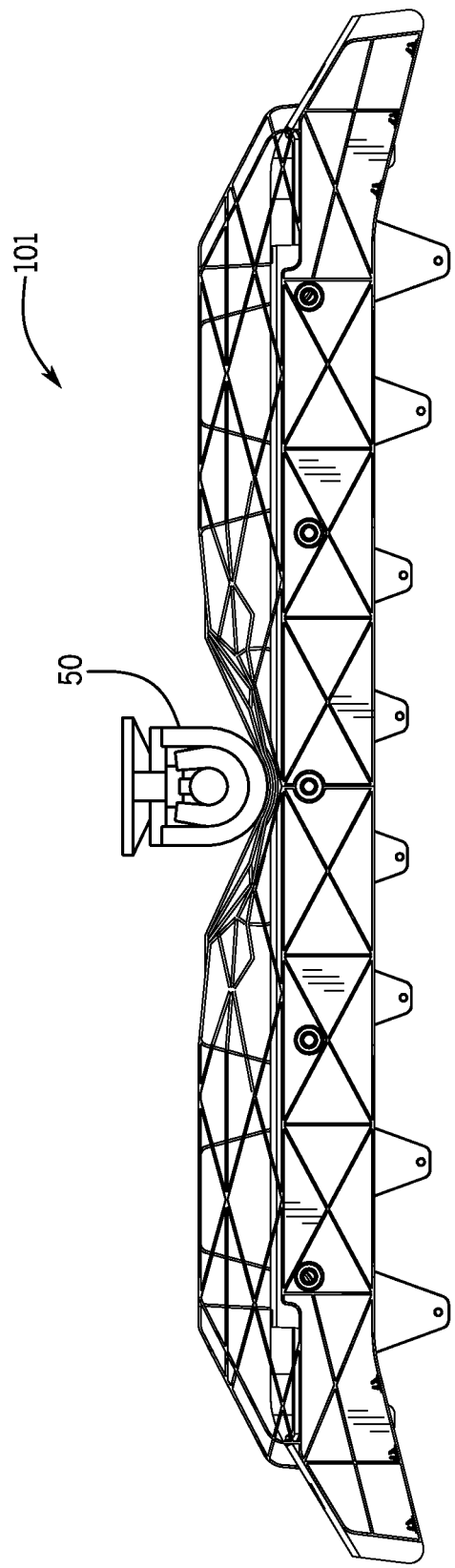
FIG. 9 is a top view of the energy absorber shown in FIG. 8, with a leg form loading the energy absorber at the midpoint cross-car.
Figure 10:
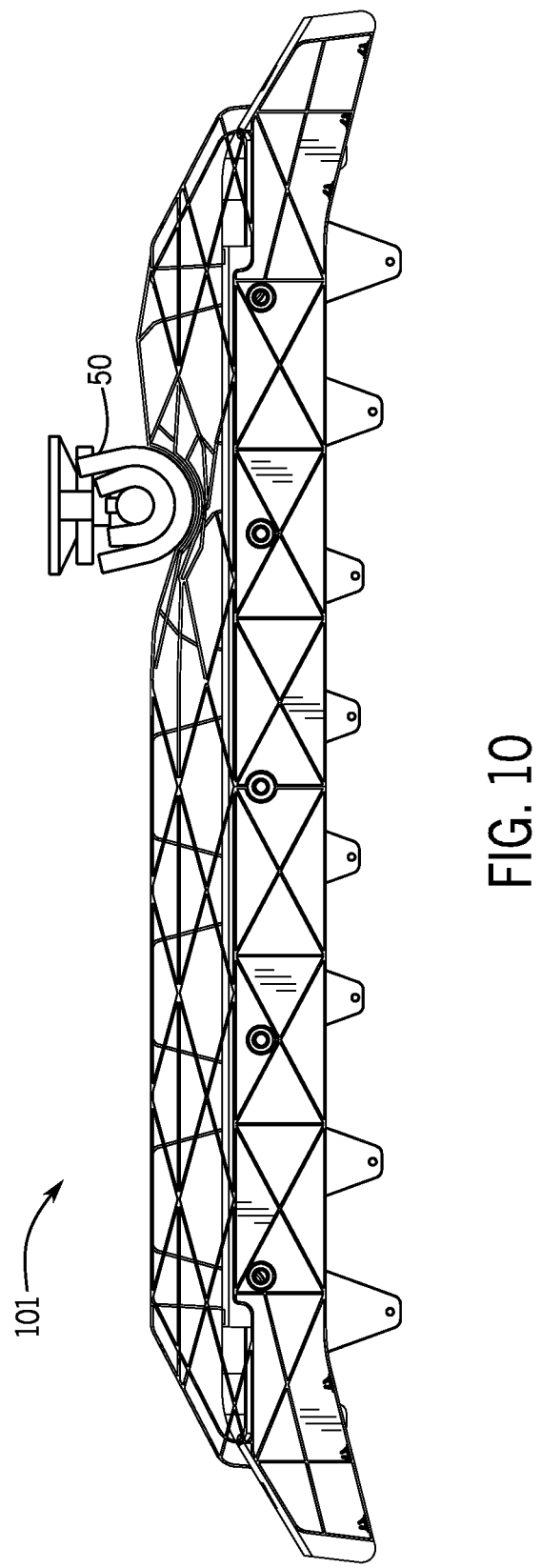
FIG. 10 is another top view of the energy absorber shown in FIG. 8, with the leg form loading the energy absorber at an outboard point.

FIGS. 8-10 illustrate the EA 101 with a portion thereof (e.g., a front portion) meshed to illustrate its energy absorption using a finite element analysis (FEA) model. FIG. 8 illustrates the meshed EA 101 prior to impact (i.e., prior to loading and energy absorption), with the lateral axis LA (e.g., the cross-car axis of the vehicle) illustrated for clarity. The upper and lower layers (e.g., layers 121, 122) having the meshed latticework structures connect and stabilize the middle/intermediate layer (e.g., layer 123). This structure is configured to provide a more even and consistent performance upon impact (e.g., for low speed bumper impacts and pedestrian protection during impacts with pedestrians). FIG. 9 illustrates the EA 101 absorbing energy after a leg form 50 has impacted and deformed a portion of the EA 101. In FIG. 9, the leg form 50 is shown contacting the approximate center (e.g., cross-car) of the EA 101. FIG. 10 illustrates a similar leg form 50 (as shown in FIG. 9) impacting and deforming the EA 101 at a location closer to an outboard side (i.e., offset in an outboard direction from the approximate center) of the EA 101. As shown, the loading from the leg form 50 is dispersed within the EA's uniform structure, and the energy from the impact is absorbed as the meshed members plastically deform (e.g., crumple, crush, etc.). The energy is dispersed more in the EA 101 due primarily to the construction of the first and second layers of the EA. The patterns of meshed members are interconnected such that loads are transferred both laterally to adjacent sets of meshed members, as well as rearwardly to additional sets of meshed members. EAs formed of separate spaced-apart box sections may not transfer loads, for example, laterally to adjacent box sections.

FIGS. 11 and 12 illustrate a finite element analysis (FEA) model of the EA 101 being loaded from the front of the EA by the leg form 50. A "contour shading" has been used to show the relative high levels of stress/strain due to the loading. As shown, the areas having a relative high stress/strain H (e.g., levels approaching or at the yield strength of the material) are in contact with and around the leg form 50, as well as the rear side of top layer of the EA 101 directly behind the area of impact with the leg form 50. Areas having a relative medium stress/strain M are outboard of the high stress/strain H areas, as well as the rear surface of the EA 101 behind the impact. Areas having a relative low stress/strain L (e.g., levels at or relatively close to zero) are outboard of the medium stress/strain M areas and in the area of the top layer between the two high stress/strain areas H. As shown from the contour shading, the loading is disbursed across a large area of the EA 101.

FIGS. 13 and 14 illustrate an FEA analysis model of the end 112 of the EA 101 being impacted by a leg form 50. FIG. 13 shows the end 112 of the EA 101 just prior to impact by the leg form 50. FIG. 14 shows the end 112 just after impact by the leg form 50. A first part (e.g., forward part 112a) of the end 112 of the EA 101 is configured to crush to absorb energy from the impact, and a second part (e.g., rearward part 112b) of the end 112 is configured to deflect the leg form 50, such as outwardly and laterally away from the EA 101 and the car. The impact performance of the end 112 of the EA 101 can be tailored by, such as, for example, the structural configuration of the layers (e.g., the first layer, second layer, and/or third layer), how the layers transition from the central portion to the end(s) 112, and whether additional supports are used with the EA 101 (e.g., reinforcing brackets), as well as other aspects. By way of example, FIGS. 19-23 illustrate an EA having a reinforcement bracket for tailoring the loading of the EA (e.g., at the ends thereof).

As noted above, FIGS. 15 and 16 illustrate graphs of force over time (i.e. force vs. time) comparing a conventional energy absorber to an energy absorber of this application (e.g., the EA 101). The graph shown in FIG. 15 is for a conventional energy absorber that is configured having several separate longitudinal lobes extending outwardly along the lateral axis of the bumper/vehicle. Two curves $C_1$, $C_2$ are shown on the graph in FIG. 15, with the first curve $C_1$ representing force imparted into one of the walls (e.g., forward facing wall) of the block structure of the EA, and the second curve $C_2$ representing force imparted into the EA at a location that is between two adjacent block structures, such as in a gap between two forwardly extending lobes. As shown, both curves $C_1$, $C_2$ have times at which the forces exceed the force limits. As seen from the graph, the individual block structures of a conventional energy absorber provide very different force (over time) curves, which make it difficult to achieve a more uniform square wave force curve that remains below the allowable force limits during loading.

Figure 16:
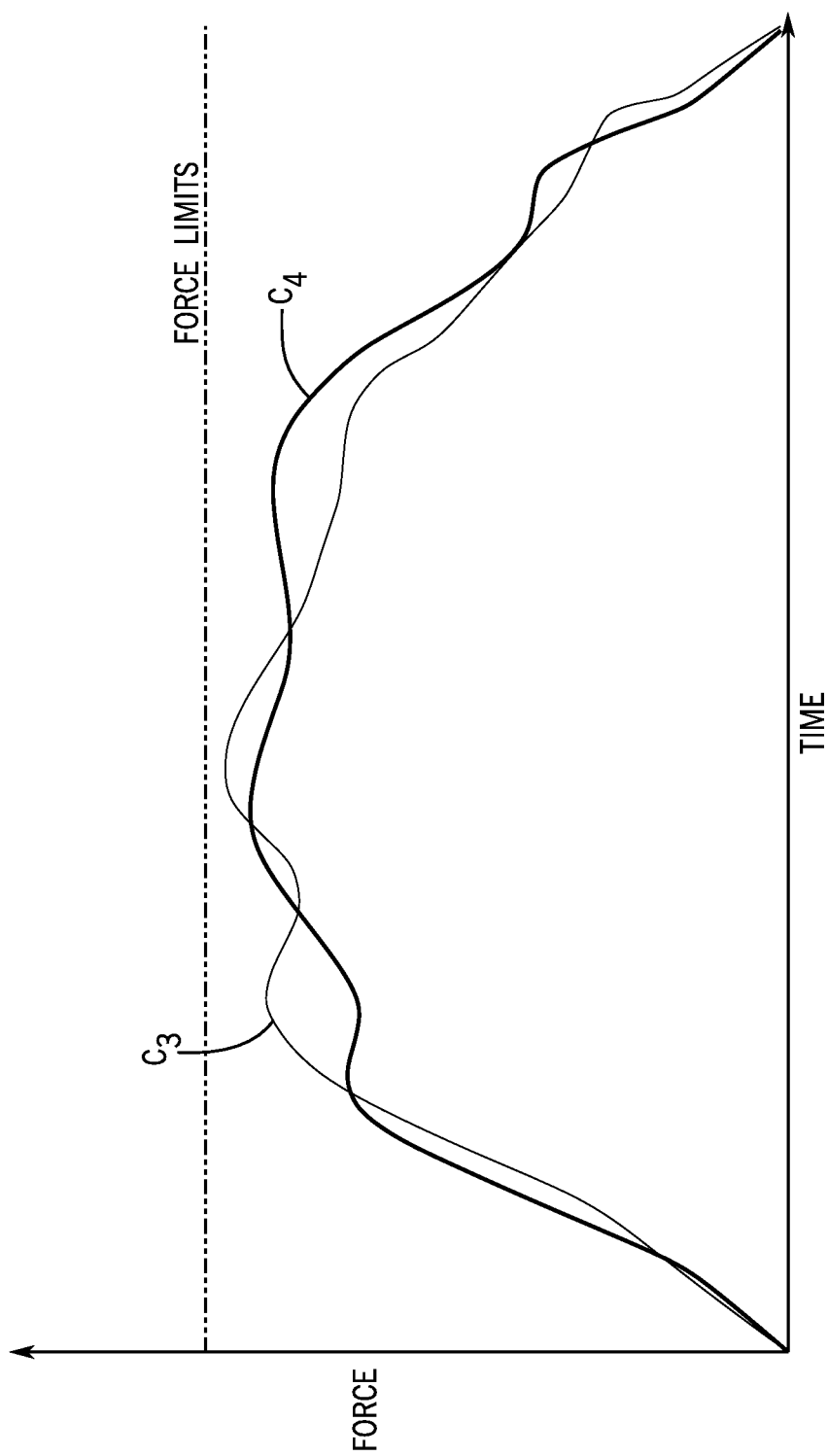
FIG. 16 is a graph illustrating force over time curves for an energy absorber as described in this application.

The graph shown in FIG. 16 is for an energy absorber, as described in this application, such as the EA 101. Two curves $C_3$, $C_4$ are shown depicting two different locations along the EA (e.g., EA 101) in which the forces are imparted. As shown in FIG. 16, neither the curve $C_3$ nor the curve $C_4$ exceeds the force limit at any time during loading. Thus, the EA 101 reduces the peak loading conditions, such as by distributing the loads across the EA, to ensure that forces between the leg form and the EA 101 do not exceed the force limit. The more uniform structure of the EA 101 advantageously has similar force (over time) curves and, therefore, is able to achieve a more uniform square wave force curve that remains below the allowable force limits during loading.

Figure 17:
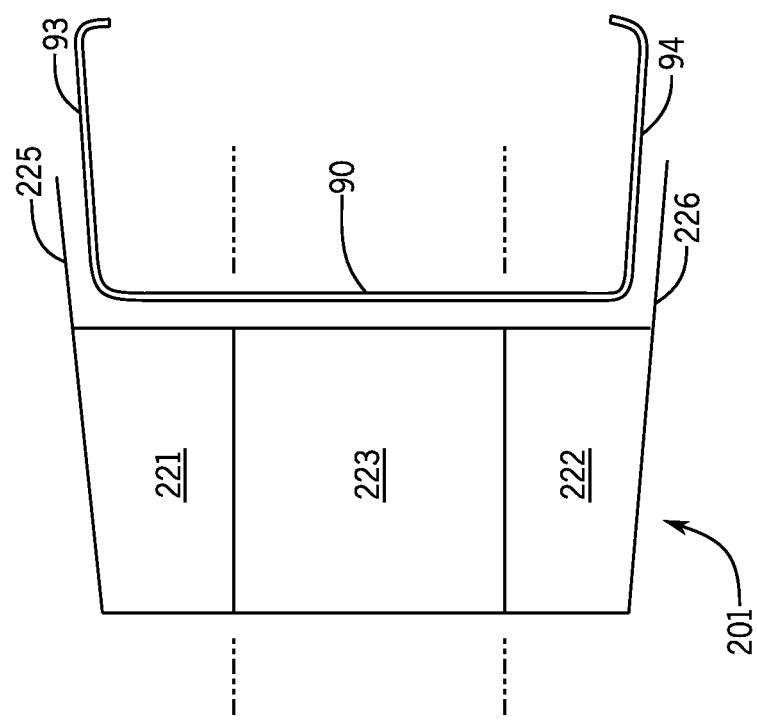
FIG. 17 is a side schematic view of another exemplary embodiment of an energy absorber.
Figure 19:
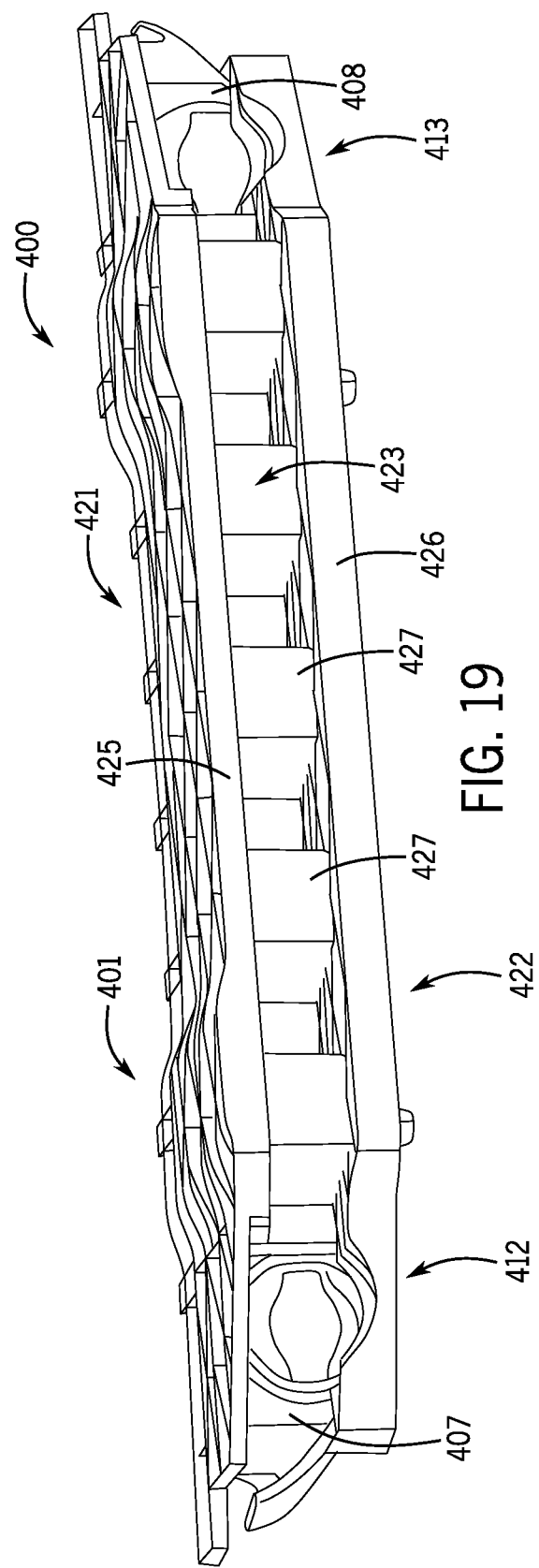
FIG. 19 is a front perspective view of an exemplary embodiment of a bumper assembly having an energy absorber for use with a vehicle.

FIG. 17 illustrates another exemplary embodiment of an energy absorber 201 that is configured for use with a bumper assembly. The EA 201 is configured to mount to a front side of an impact beam 90 and includes a channel that is configured to receive the impact beam 90 therein. The EA 201 includes a first layer 221, a second layer 222, and a third layer 223 that is provided between the first and second layers 221, 222. The first, second, and third layers 221, 222, 223 include one or more pluralities of meshed members and are configured to be located forward of the front side of the impact beam, such that none of these layers are provided directly on top of (e.g., above) a top side 93 of the impact beam 90 or directly below a bottom side 94 of the impact beam 90. The EA 201 may include an upper member 225 that extends rearwardly from the first layer 221 over at least portion of the top side 93 of the impact beam 90, such as to facilitate coupling the EA 201 and the beam 90 (e.g., the upper member 225 to the top side 93). The EA 201 may include a lower member 226 that extends rearwardly from the second layer 222 under at least portion of the bottom side 94 of the impact beam 90, such as to facilitate coupling the EA 201 and the beam 90 (e.g., the lower member 226 to the bottom side 94). The arrangement/configuration of the EA 201 may be advantageous for vehicle applications that are not subjected to step loading.

Figure 18:
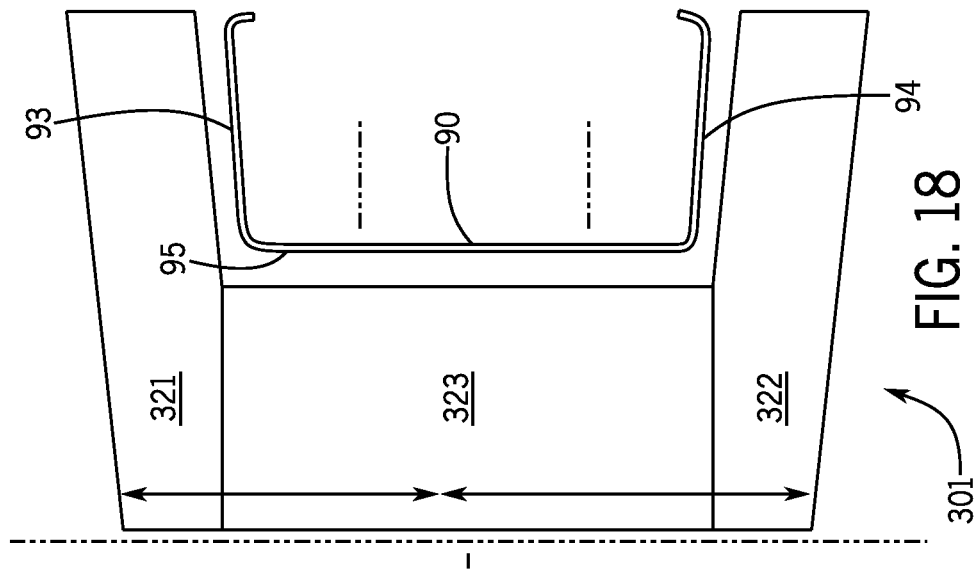
FIG. 18 is a side schematic view of yet another exemplary embodiment of an energy absorber.

FIG. 18 illustrates yet another exemplary embodiment of an energy absorber 301 that is configured for use with a bumper assembly. The EA 301 is configured to mount to a front side of an impact beam 90, which is shown having a generally C-shaped cross-section. The EA 301 includes a first (e.g., upper) layer 321, a second (e.g., lower) layer 322, and a third (e.g., middle, intermediate, etc.) layer 323 that is provided between the first and second layers 321, 322. Each of the first, second, and third layers 321, 322, 323 may include a plurality of members (e.g., one or more pluralities of meshed members). For example, the first and second layers 321, 322 may include any of the meshed members disclosed herein. The third layer 323 may include members that interconnect the first and second layers, such as, for example, any of the members discussed herein. As shown, the third layer 323 is provided forward of a front side 95 of the impact beam 90 with the first layer 321 provided above the third layer 323 and the top side 93 of the impact beam 90 and with the second layer 322 provided below the third layer 323 and the bottom side 94 of the impact beam 90. Thus, each of the first and second layers 321, 322 spans across the third layer 323 and the beam 90. The arrangement/configuration of the EA 301 may increase the vertical height of the EA 301 (depicted using the arrows in FIG. 18), which may be advantageous for managing the new leg form above and below the knee rotation joint.

FIGS. 19-23 illustrate an exemplary embodiment of a bumper assembly 400 (e.g., for a vehicle) that includes an EA 401, a first (e.g., left side) reinforcing bracket 407, a second (e.g., right side) reinforcing bracket 408, and an impact beam 409. The EA 401 can be configured according to any other EA disclosed in this application, such as, for example, the EA 101, the EA 201, and/or the EA 301. For example, the EA 401 may include a first layer 421, a second layer 422, and/or a third layer 423.

Each of the first and second layers 421, 422 includes a plurality of members forming a first latticework structure having a first network of open sections between the plurality of members, such as described above for the other EAs. Each of the first and second layers 421, 422 extend between two end portions 412, 413 and between a rear member of the layer and a front member 425, 426 of the layer 421, 422. As shown, the front member 425 of the first layer 421 is separated from the front member 426 of the second layer 422 and, therefore, the front members 425, 426 are not unitary. Similarly, the third layer 423 has a plurality of front members 427 that can be separated from the front member 425, the front member 426, and/or from the other front members 427 of the third layer 423. However, two or more of the front members 425, 426, 427 may form a unitary front member, such as, for example, as disclosed elsewhere in this application.

Figure 20:
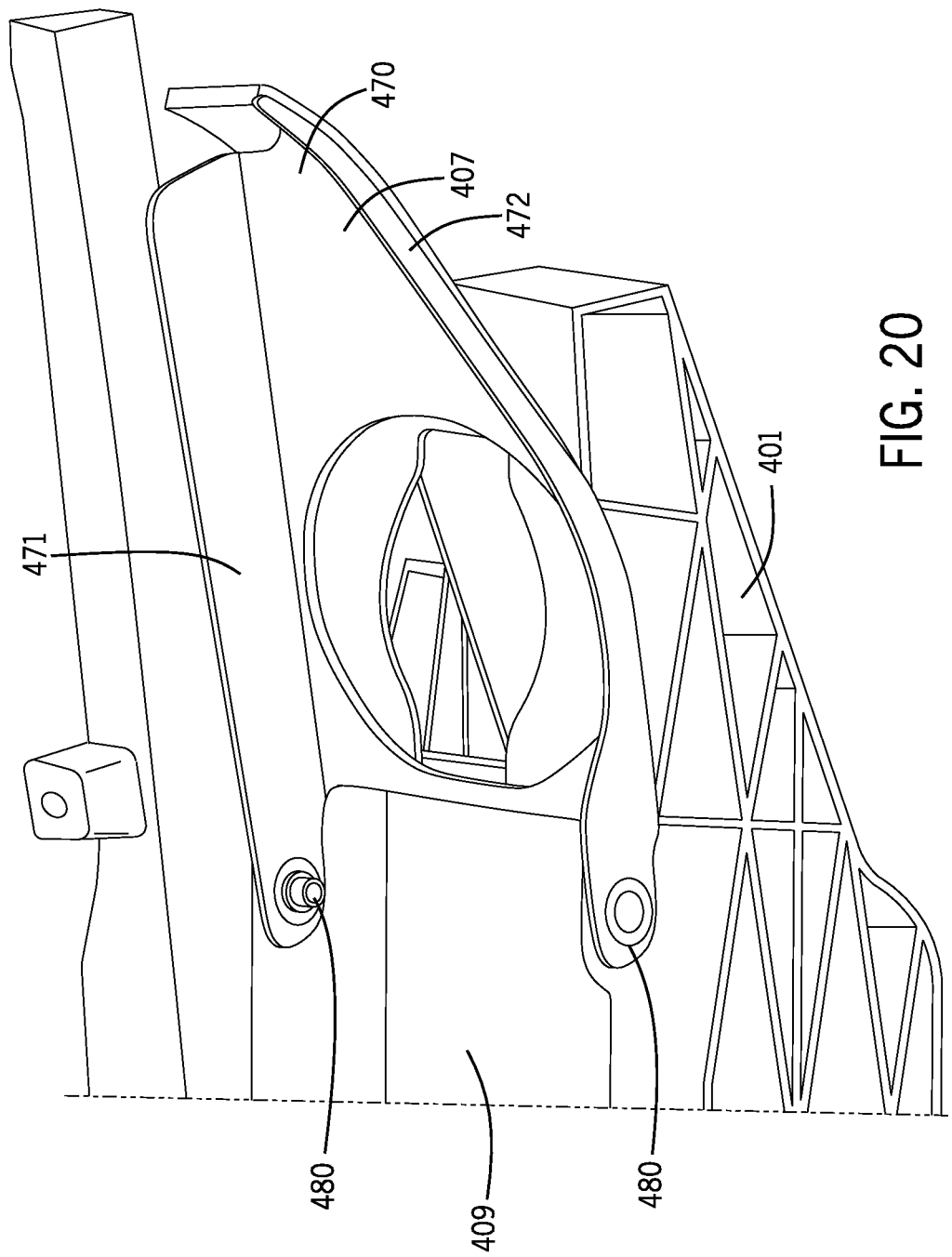
FIG. 20 is a detail view of an outboard portion of the bumper assembly shown in FIG. 19.
Figure 21:
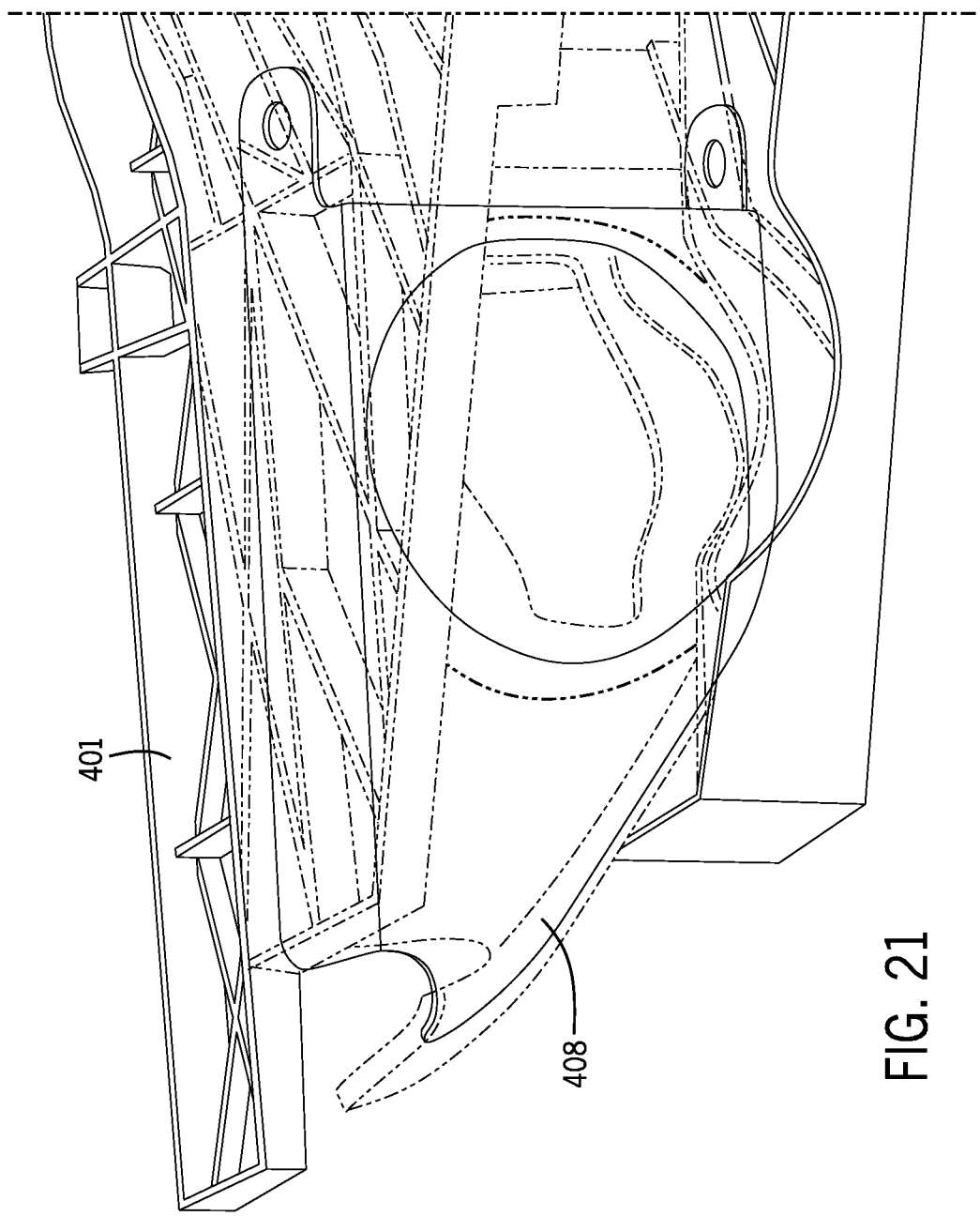
FIG. 21 is a detail view of another outboard portion of the bumper assembly shown in FIG. 19.
Figure 22:
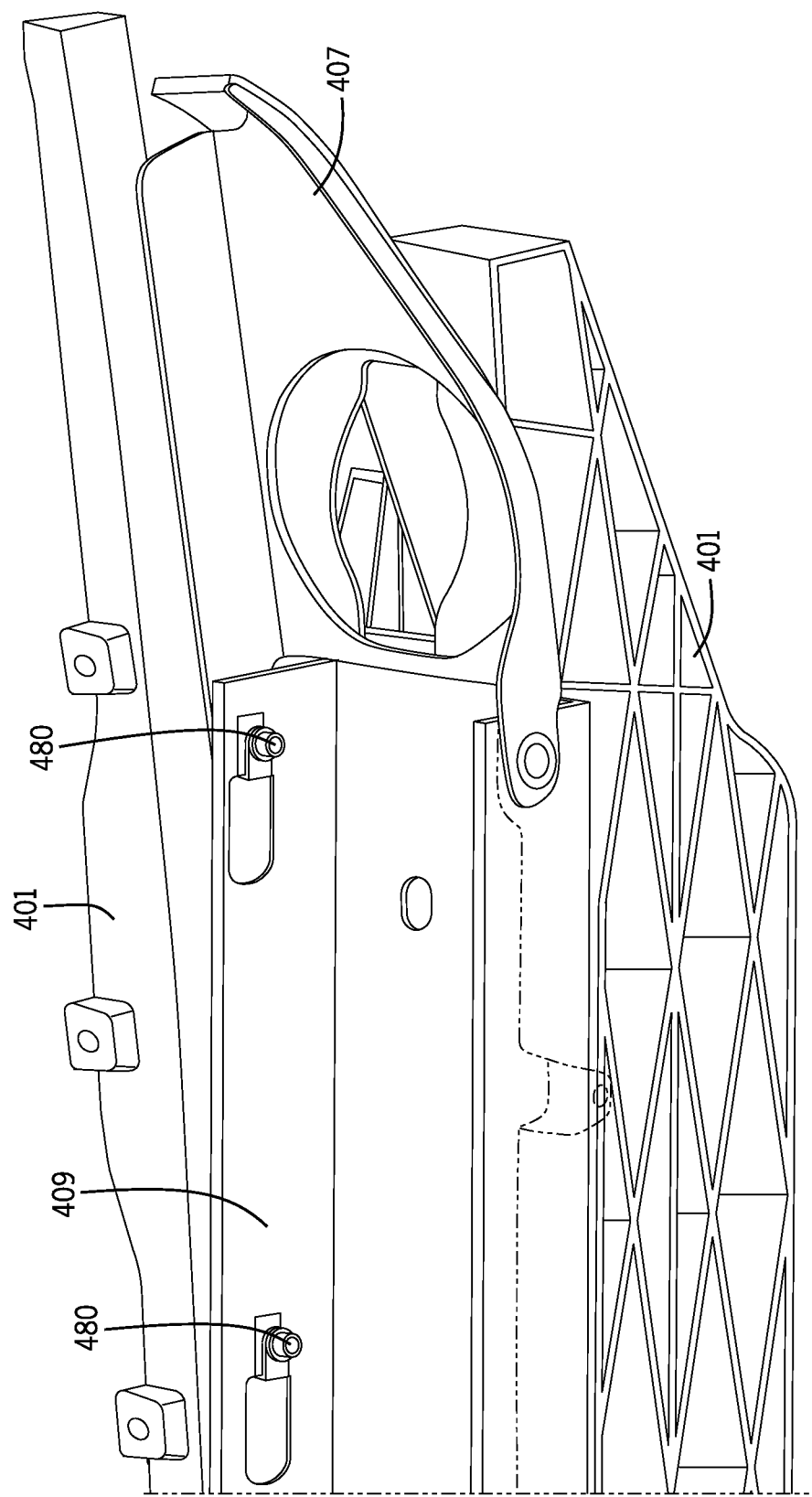
FIG. 22 is another detail view of an outboard portion of the bumper assembly shown in FIG. 19.

The first and second reinforcing brackets 407, 408, which may include a metal, an organic (e.g., a composite), other suitable material or combination thereof, are added at the outboard ends 412, 413, respectively, to strengthen the bumper assembly 400. For example, the first and second reinforcing brackets 407, 408 may advantageously improve performance (e.g., increase load carrying ability) of the EA 401, such as at elevated temperatures, while maintaining the pedestrian protection deformable area that is located forward of each bracket 407, 408. Thus, each bracket 407, 408 may tailor the load carrying performance of the EA 401 while improving pedestrian protection. Each bracket 407, 408 can be molded (e.g., over-molded) onto the EA 401, fastened (e.g., through mechanical fasteners, such as bolts, rivets, screws, etc.) to the EA 401, and/or bonded (e.g., through adhesives and other boding agents) to the EA 401. As shown in FIG. 20, each bracket 407, 408 can be fastened to an end of the beam 409 using two fasteners 80, which may be aligned along a common axis to advantageously allow the bracket to pivot relative to the beam 409 during loading (e.g., after the loading overcomes a threshold torque based at least in part on the coupling strength of the fasteners 80). As shown in FIG. 20, the bracket 407 includes a base 470, an upper flange 471, and a lower flange 472, where each flange 471, 472 extends away from the base 470 to increase the strength of the bracket 407. The bracket 408 may be configured the same as or similar to the bracket 407. The lower flange of each bracket may be configured to seat in a pocket of the EA 401 (see FIG. 21). Each flange of each bracket 407, 408 may be coupled to a mating flange of the beam 409 (e.g., an upper flange, a lower flange), as shown in FIG. 22.

Figure 23:
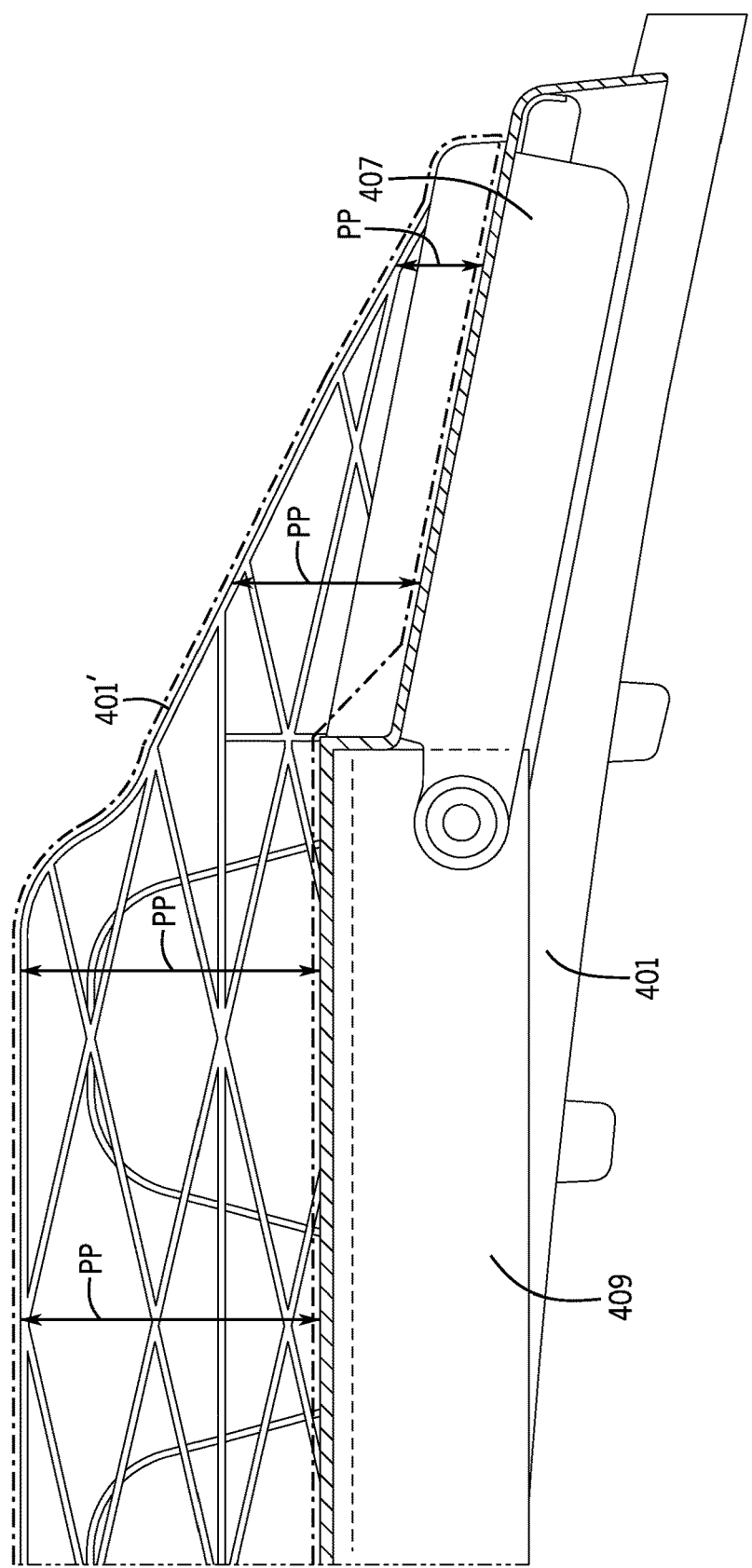
FIG. 23 is a top view of a portion of the bumper assembly shown in FIG. 19 illustrating a pedestrian protection deformable zone.

FIG. 23 illustrates a portion of the EA 401 with the bracket 407 and the beam 409 coupled to one another and to the EA 401. The EA 401 includes a pedestrian protection deformable zone that is located forward (with respect to the vehicle frame of reference) of the beam 409 and the bracket 407. The pedestrian protection deformable zone is highlighted by the boundary lines and the arrows PP (in FIG. 23) extending through various locations of the EA 401 in the fore and aft direction, and the zone of the EA 401 is shown using an FEA meshing (including the reference numeral 401' for the meshed EA 401), such as described above for other examples. A bumper assembly configured having the EA 401, the bracket 407, and the beam 409 advantageously provides a pedestrian protection deformable zone, such as shown in FIG. 14 for the EA 101, while increasing the step loading performance of the EA/bumper assembly. This arrangement can withstand a higher step loading (e.g., vertical loading) at the outboard ends relative to the assemblies not having the reinforcing bracket.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the energy absorbers as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., portion, member, pattern of members, layer, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claim.

What is claimed is:

1. An energy absorber for a vehicle bumper assembly, the energy absorber comprising:
   a central portion provided between two end portions, wherein the central portion is a multi-layer structure comprising:
      a unitary front member extending between the two end portions, the unitary front member having a plurality of openings that are spaced apart from one another;
      a first layer comprising a first plurality of members forming a first latticework structure comprising a first network of open sections between the first plurality of members, the first layer extending between the two end portions and between a rear member of the first layer and the unitary front member;
      a second layer comprising a second plurality of members forming a second latticework structure comprising a second network of open sections between the second plurality of members, the second layer extending between the two end portions and between a rear member of the second layer and the unitary front member; and a third layer disposed between and interconnecting the first and second layers, wherein the third layer comprises a third plurality of members forming a series of alternating open and closed sections between and interconnecting the first and second layers, with each open section of the third layer aligned with one opening of the plurality of openings of the front member.

2. The energy absorber of claim 1, wherein the first layer is a top layer and the second layer is a bottom layer.

3. The energy absorber of claim 2, wherein the third plurality of members comprises a rear member and a plurality of fore and aft support members that are spaced apart from one another, so that one open section is formed between each pair of adjacent fore and aft support members, wherein each fore and aft support member extends between the rear member of the third plurality of members and the unitary front member and between a bottom of the top layer and a top of the bottom layer.

4. The energy absorber of claim 3, wherein the rear member of the third plurality of members is positioned closer to the unitary front member compared to the rear members of the first and second plurality of members to form a pocket that receives a metal impact beam of the vehicle bumper assembly, and wherein the pocket is disposed between the bottom of the top layer and the top of the bottom layer.

5. The energy absorber of claim 1, wherein the unitary front member is generally planar.

6. The energy absorber of claim 1, wherein the first plurality of members comprises a plurality of sets of a first pattern of interconnected members arranged side by side in a lateral direction between the two end portions, wherein each set of the first pattern of interconnected members comprises:
a first diagonal member aligned at a first oblique angle relative to the rear member of the first layer; and
a second diagonal member interconnected with the first diagonal member and aligned at a second oblique angle relative to the rear member of the first layer.

7. The energy absorber of claim 6, wherein each second diagonal member is aligned at an angle relative to the associated first diagonal member, the first oblique angle is equal to the second oblique angle, and each of the first and second diagonal members is generally planar.

8. The energy absorber of claim 1, wherein the second plurality of members comprises a plurality of sets of a first pattern of interconnected members arranged side by side in a lateral direction between the two end portions, wherein each set of the first pattern of interconnected members comprises:
a first diagonal member aligned at a first oblique angle relative to the rear member of the second layer; and
a second diagonal member interconnected with the first diagonal member and aligned at a second oblique angle relative to the rear member of the second layer.

9. An energy absorber for a vehicle bumper assembly, the energy absorber comprising:
a central portion provided between two end portions, wherein the central portion is a multi-layer structure comprising:
a unitary front member extending between the two end portions;
a first layer comprising a first plurality of members forming a first latticework structure comprising a first network of open sections between the first plurality of members, the first layer extending between the two end portions and between a rear member of the first layer and the unitary front member;
a second layer comprising a second plurality of members forming a second latticework structure comprising a second network of open sections between the second plurality of members, the second layer extending between the two end portions and between a rear member of the second layer and the unitary front member; and
a third layer disposed between and interconnecting the first and second layers;
wherein the first plurality of members comprises a plurality of sets of a first pattern of interconnected members arranged side by side in a lateral direction between the two end portions, wherein each set of the first pattern of interconnected members comprises:
a first diagonal member aligned at a first oblique angle relative to the rear member of the first layer;
a second diagonal member interconnected with the first diagonal member and aligned at a second oblique angle relative to the rear member of the first layer; and
at least one side member extending from the rear member of the first layer toward the unitary front member between an end of the first diagonal member and an end of the second diagonal member.

10. An energy absorber for a vehicle bumper assembly, the energy absorber comprising:
a central portion provided between two end portions, wherein the central portion is a multi-layer structure comprising:
a unitary front member extending between the two end portions;
a first layer comprising a first plurality of members forming a first latticework structure comprising a first network of open sections between the first plurality of members, the first layer extending between the two end portions and between a rear member of the first layer and the unitary front member;
a second layer comprising a second plurality of members forming a second latticework structure comprising a second network of open sections between the second plurality of members, the second layer extending between the two end portions and between a rear member of the second layer and the unitary front member; and
a third layer disposed between and interconnecting the first and second layers;
wherein the first plurality of members comprises a plurality of sets of a first pattern of interconnected members arranged side by side in a lateral direction between the two end portions, wherein each set of the first pattern of interconnected members comprises:
a first diagonal member aligned at a first oblique angle relative to the rear member of the first layer; and
a second diagonal member interconnected with the first diagonal member and aligned at a second oblique angle relative to the rear member of the first layer;
wherein the first plurality of members comprises a plurality of sets of a second pattern of interconnected members arranged side by side in the lateral direction between the two end portions and between the first pattern of interconnected members and the unitary front member, wherein each set of the second pattern of interconnected members comprises:
a third diagonal member aligned at a third oblique angle relative to the rear member of the first layer; and
a fourth diagonal member interconnected with the third diagonal member and aligned at a fourth oblique angle relative to the rear member of the first layer.

11. The energy absorber of claim 10, wherein the third oblique angle is equal to the fourth oblique angle, and the third oblique angle is different than at least one of the first and second oblique angles.

12. The energy absorber of claim 11, further comprising an intermediate member disposed between the first pattern of interconnected members and the second pattern of interconnected members, wherein the intermediate member is generally parallel to at least one of the unitary front member or the rear member of the first layer.

13. The energy absorber of claim 10, wherein the second plurality of members comprises a plurality of sets of a third pattern of interconnected members arranged side by side in the lateral direction between the two end portions, wherein each set of the third pattern of interconnected members comprises:
a fifth diagonal member aligned at a fifth oblique angle relative to the rear member of the second layer; and
a sixth diagonal member interconnected with the fifth diagonal member and aligned at a sixth oblique angle relative to the rear member of the second layer.

14. An energy absorber for use with an impact beam in a bumper assembly for a vehicle, the energy absorber comprising:
a unitary front member;
a first layer having an open and closed latticework structure, the first layer comprising a plurality of a first pattern of members arranged side by side and located between a rear member of the first layer and the unitary front member, each of the first pattern of members comprising:
a first diagonal member at a first angle relative to the rear member of the first layer;
a second diagonal member interconnected with the first diagonal member and at a second angle relative to the rear member of the first layer; and
at least one side member extending from the rear member of the first layer toward the unitary front member and extending between an end of the first diagonal member and an end of the second diagonal member; and
a second layer having an open and closed latticework structure, the second layer comprising a plurality of a second pattern of members arranged side by side and located between a rear member of the second layer and the unitary front member.

15. The energy absorber of claim 14, wherein each second pattern of members of the second layer comprises:
a third diagonal member at a third angle relative to the rear member of the second layer; and
a fourth diagonal member interconnected with the third diagonal member and at a fourth angle relative to the rear member of the second layer.

16. The energy absorber of claim 15, wherein at least one of the first and second layers further comprises a plurality of a third pattern of members arranged side by side and located between the rear member of the associated layer and the unitary front member, each third pattern of members comprising:
a fifth diagonal member aligned at a fifth angle relative to the rear member of the associated layer;
a sixth diagonal member interconnected with the fifth diagonal member and aligned at a sixth angle relative to the rear member of the associated layer; and
at least one intermediate member that extends between an end of the fifth diagonal member and an end of the sixth diagonal member, each intermediate member being generally parallel to at least one of the unitary front member or the rear member of the associated layer.

17. The energy absorber of claim 16, further comprising a third layer disposed between and interconnecting the first and second layers, wherein the third layer comprises:
a rear member; and
a plurality of fore and aft support members that are spaced apart from one another and extend from the rear member of the third layer to the unitary front member to define a series of open and closed sections;
wherein each open section has an opening in the unitary front member, a pocket is defined by the rear member opposite the plurality of fore and aft support members, and the pocket is configured to receive and retain the impact beam.

18. An energy absorber for a bumper assembly for a vehicle, the energy absorber comprising:
a first layer comprising a unitary front member, a unitary rear member, and a plurality of interconnected diagonal members forming a latticework structure that extends between the front and rear members of the first layer, wherein each diagonal member of the first layer is aligned obliquely relative to at least one of the front member or the rear member of the first layer;
a second layer comprising a unitary front member, a unitary rear member, and a plurality of interconnected diagonal members forming a latticework structure that extends between the front and rear members of the second layer, wherein each diagonal member of the second layer is aligned obliquely relative to at least one of the front member or the rear member of the second layer;
a third layer disposed between the first and second layers; and
a metal impact beam nested in a channel rearward of a rear member of the third layer and below a bottom of the first layer.

19. The energy absorber of claim 18, wherein the metal impact beam comprises an upper flange coupled to the bottom of the first layer through at least one fastener.

20. The energy absorber of claim 19, wherein the front member of the first layer and the front member of the second layer are unitary.

* * * * *